(12) United States Patent
Mueller et al.

(10) Patent No.: US 8,573,498 B2
(45) Date of Patent: Nov. 5, 2013

(54) IDENTIFYING DUPLICATE PRINTED PAPER CASH LETTERS

(75) Inventors: Randall Lee Mueller, Kansas City, MO (US); Richard Rodrigues, Naperville, IL (US); David Treptow, Milwaukee, WI (US)

(73) Assignees: Federal Reserve Bank of Kansas City, Kansas City, MO (US); Federal Reserve Bank of Chicago, Chicago, IL (US)

( * ) Notice: Subject to any disclaimer, the term of this patent is extended or adjusted under 35 U.S.C. 154(b) by 1054 days.

(21) Appl. No.: 11/983,035

(22) Filed: Nov. 6, 2007

(65) Prior Publication Data
US 2009/0114715 A1    May 7, 2009

(51) Int. Cl.
*G06K 19/00* (2006.01)
(52) U.S. Cl.
USPC ....... 235/462.01; 235/435; 235/439; 235/454
(58) Field of Classification Search
USPC ............................................. 235/462.01, 379
See application file for complete search history.

(56) References Cited

U.S. PATENT DOCUMENTS

| | | |
|---|---|---|
| 4,264,808 A | 4/1981 | Owens et al. |
| 4,270,042 A | 5/1981 | Case |
| 4,523,330 A | 6/1985 | Cain |
| 4,694,397 A | 9/1987 | Grant et al. |
| 4,823,264 A | 4/1989 | Deming |
| 4,948,174 A | 8/1990 | Thomson et al. |
| 4,974,878 A | 12/1990 | Josephson |
| 5,038,283 A | 8/1991 | Caveney |
| 5,120,944 A | 6/1992 | Kern et al. |
| 5,121,945 A | 6/1992 | Thomson et al. |
| 5,187,750 A | 2/1993 | Behera |
| 5,198,975 A * | 3/1993 | Baker et al. ...................... 705/45 |
| 5,237,159 A | 8/1993 | Stephens et al. |
| 5,265,007 A * | 11/1993 | Barnhard et al. ............... 705/45 |
| 5,373,550 A | 12/1994 | Campbell et al. |
| 5,412,190 A | 5/1995 | Josephson et al. |
| 5,583,759 A * | 12/1996 | Geer ............................... 705/45 |
| 5,600,732 A | 2/1997 | Ott et al. |
| 5,668,897 A | 9/1997 | Stolfo |

(Continued)

OTHER PUBLICATIONS

"Vision, Strategy & Approach to Image Quality & Archive Integrity, A Review of Carreker's Current Initiatives Towards Image Quality Detection & Resolution", Federal Reserve System, Aug. 19, 2003, Copyright © 2003 Carreker Corporation, pp. 1-43.

(Continued)

*Primary Examiner* — Michael G Lee
*Assistant Examiner* — Matthew Mikels
(74) *Attorney, Agent, or Firm* — King & Spalding

(57) ABSTRACT

A printed cash letter includes a machine-readable identifier, such as a barcode, identifying the cash letter. Upon printing, information from the identifier is read and stored in a first record. To determine whether the cash letter is a duplicate, a check presentment module compares information from the identifier with information in the first record. If information identifying the cash letter already exists in the first record, the cash letter is a duplicate. To verify cash letter printing, information identifying multiple cash letters to be printed is stored in a second record. Upon printing a portion of the cash letters, information read from identifiers on the printed cash letters is compared with information in the second record. If the second record includes information regarding a cash letter not identified in the information scanned from the barcodes, then the check presentment module identifies the cash letter as having not been printed.

37 Claims, 18 Drawing Sheets

(56) References Cited

U.S. PATENT DOCUMENTS

| | | | |
|---|---|---|---|
| 5,677,955 A | 10/1997 | Doggett et al. |
| 5,680,611 A | 10/1997 | Rail et al. |
| 5,687,250 A | 11/1997 | Curley et al. |
| 5,689,579 A | 11/1997 | Josephson |
| 5,692,065 A | 11/1997 | Prakash et al. |
| 5,754,674 A | 5/1998 | Ott et al. |
| 5,783,808 A | 7/1998 | Josephson |
| 5,790,717 A | 8/1998 | Judd |
| 5,819,236 A | 10/1998 | Josephson |
| 5,832,140 A | 11/1998 | Stapleton et al. |
| 5,930,778 A | 7/1999 | Geer |
| 5,937,084 A | 8/1999 | Crabtree et al. |
| 5,940,524 A | 8/1999 | Murayama et al. |
| 5,963,654 A | 10/1999 | Prakash et al. |
| 6,019,282 A | 2/2000 | Thompson et al. |
| 6,097,834 A | 8/2000 | Krouse et al. |
| 6,115,509 A | 9/2000 | Yeskel |
| 6,170,744 B1 | 1/2001 | Lee et al. |
| 6,236,756 B1 | 5/2001 | Kimura et al. |
| 6,243,689 B1 | 6/2001 | Norton |
| 6,351,546 B1 | 2/2002 | Murayama et al. |
| 6,351,553 B1 | 2/2002 | Hayosh |
| 6,450,403 B1 | 9/2002 | Martens et al. |
| 6,571,000 B1 | 5/2003 | Rasmussen et al. |
| 6,577,761 B1 | 6/2003 | Kanno et al. |
| 6,585,775 B1 | 7/2003 | Cosentino et al. |
| 6,658,139 B1 | 12/2003 | Cookingham et al. |
| 6,717,592 B2 | 4/2004 | Gusler et al. |
| 6,792,133 B2 | 9/2004 | Ott et al. |
| 6,850,950 B1 | 2/2005 | Clarke et al. |
| 6,854,656 B2 | 2/2005 | Matsumori |
| 6,912,297 B2 | 6/2005 | Scott et al. |
| 6,963,885 B2 | 11/2005 | Calkins et al. |
| 6,996,263 B2 | 2/2006 | Jones et al. |
| 7,000,828 B2 | 2/2006 | Jones |
| 7,066,668 B2 | 6/2006 | Sandison et al. |
| 7,066,669 B2 | 6/2006 | Lugg |
| 7,082,216 B2 | 7/2006 | Jones et al. |
| 7,092,560 B2 | 8/2006 | Jones et al. |
| 7,099,845 B2 | 8/2006 | Higgins et al. |
| 7,120,606 B1 | 10/2006 | Ranzini et al. |
| 7,167,580 B2 | 1/2007 | Klein et al. |
| 7,283,656 B2 | 10/2007 | Blake et al. |
| 7,386,511 B2 | 6/2008 | Buchanan et al. |
| 7,539,646 B2 | 5/2009 | Gilder et al. |
| 7,546,275 B1 | 6/2009 | Herzberg et al. |
| 2001/0039534 A1 | 11/2001 | Keene |
| 2001/0051921 A1* | 12/2001 | Garner et al. ............... 705/42 |
| 2002/0150279 A1 | 10/2002 | Scott et al. |
| 2003/0158811 A1 | 8/2003 | Sanders et al. |
| 2003/0202690 A1 | 10/2003 | Jones et al. |
| 2003/0208421 A1 | 11/2003 | Vicknair |
| 2003/0225704 A1 | 12/2003 | Park et al. |
| 2004/0030621 A1 | 2/2004 | Cobb |
| 2004/0068464 A1 | 4/2004 | Buchanan et al. |
| 2004/0109596 A1 | 6/2004 | Doran |
| 2004/0133516 A1 | 7/2004 | Buchanan et al. |
| 2004/0143621 A1 | 7/2004 | Fredrickson et al. |
| 2004/0148235 A1 | 7/2004 | Craig et al. |
| 2004/0181485 A1 | 9/2004 | Finch |
| 2004/0218203 A1 | 11/2004 | Mastie et al. |
| 2004/0236688 A1 | 11/2004 | Bozeman |
| 2005/0018896 A1 | 1/2005 | Heit et al. |
| 2005/0044043 A1 | 2/2005 | Gooding et al. |
| 2005/0071283 A1 | 3/2005 | Randle et al. |
| 2005/0080719 A1 | 4/2005 | Sellen et al. |
| 2005/0080738 A1 | 4/2005 | Sellen et al. |
| 2005/0086136 A1 | 4/2005 | Love et al. |
| 2005/0097046 A1 | 5/2005 | Singfield |
| 2005/0097050 A1 | 5/2005 | Orcutt |
| 2005/0109833 A1 | 5/2005 | Page |
| 2005/0129300 A1 | 6/2005 | Sandison et al. |
| 2005/0139670 A1 | 6/2005 | McGlamery |
| 2005/0144131 A1 | 6/2005 | Aziz |
| 2005/0171899 A1 | 8/2005 | Dunn et al. |
| 2005/0175221 A1 | 8/2005 | Scott et al. |
| 2005/0203857 A1 | 9/2005 | Friedman |
| 2005/0211763 A1 | 9/2005 | Sgambati et al. |
| 2005/0213805 A1 | 9/2005 | Blake et al. |
| 2005/0220324 A1 | 10/2005 | Klein et al. |
| 2005/0238252 A1 | 10/2005 | Prakash et al. |
| 2005/0243378 A1 | 11/2005 | Klein et al. |
| 2005/0243379 A1 | 11/2005 | Klein et al. |
| 2005/0244035 A1 | 11/2005 | Klein et al. |
| 2005/0252960 A1 | 11/2005 | Murata |
| 2005/0256839 A1 | 11/2005 | Leong et al. |
| 2005/0281448 A1 | 12/2005 | Lugg |
| 2006/0006222 A1 | 1/2006 | Brey et al. |
| 2006/0023930 A1 | 2/2006 | Patel et al. |
| 2006/0045321 A1 | 3/2006 | Yu |
| 2006/0045600 A1* | 3/2006 | Lugg ............................ 400/578 |
| 2006/0080245 A1 | 4/2006 | Bahl et al. |
| 2006/0106717 A1 | 5/2006 | Randle et al. |
| 2006/0112013 A1 | 5/2006 | Maloney |
| 2006/0118613 A1 | 6/2006 | McMann et al. |
| 2006/0133277 A1 | 6/2006 | Carozza |
| 2006/0167784 A1 | 7/2006 | Hoffberg |
| 2006/0182331 A1 | 8/2006 | Gilson et al. |
| 2006/0182332 A1 | 8/2006 | Weber |
| 2006/0184441 A1 | 8/2006 | Haschka et al. |
| 2006/0186194 A1 | 8/2006 | Richardson et al. |
| 2006/0188310 A1 | 8/2006 | Sandison et al. |
| 2006/0188311 A1 | 8/2006 | Lugg |
| 2006/0191998 A1 | 8/2006 | Mueller et al. |
| 2006/0206427 A1 | 9/2006 | Love et al. |
| 2006/0212391 A1 | 9/2006 | Norman et al. |
| 2006/0229987 A1* | 10/2006 | Leekley ...................... 705/45 |
| 2006/0237526 A1 | 10/2006 | Mueller et al. |
| 2006/0248009 A1* | 11/2006 | Hicks et al. ................ 705/40 |
| 2006/0280354 A1 | 12/2006 | Murray |
| 2007/0095888 A1 | 5/2007 | Mueller et al. |
| 2007/0100672 A1 | 5/2007 | McBrida et al. |
| 2007/0156438 A1 | 7/2007 | Popadic et al. |
| 2007/0235518 A1 | 10/2007 | Mueller et al. |
| 2007/0244782 A1 | 10/2007 | Chimento |
| 2007/0288382 A1* | 12/2007 | Narayanan et al. ........... 705/45 |
| 2008/0006687 A1 | 1/2008 | Mueller et al. |
| 2008/0097899 A1* | 4/2008 | Jackson et al. .............. 705/39 |
| 2008/0103790 A1 | 5/2008 | Abernethy et al. |
| 2008/0159655 A1 | 7/2008 | Breeden et al. |
| 2008/0162319 A1 | 7/2008 | Breeden et al. |
| 2008/0162320 A1 | 7/2008 | Mueller et al. |
| 2008/0162321 A1 | 7/2008 | Breeden et al. |
| 2008/0162322 A1 | 7/2008 | Breeden et al. |
| 2008/0247629 A1* | 10/2008 | Gilder et al. ................ 382/137 |

OTHER PUBLICATIONS

"Image Exchange Suite, Image Enabling Check Presentment", Federal Reserve System, Aug. 19, 2003, Copyright © 2003 Carreker Corporation, pp. 1-11.

"Image Inspector Questions", from presentation dated Jul. 2003, pp. 1-2.

"FRB Check 21 Project, Federal Reserve Financial Services, Carreker Requirements Response", Nov. 18, 2003, Copyright © 2002 Carreker Corporation, pp. 1-18.

"FRB Check 21 Project, Federal Reserve Financial Services, Additional Carreker Proposals", Nov. 18, 2003, Copyright © 2002 Carreker Corporation, pp. 1-30.

"SortLogic Systems Ushers in New Electronic Banking Era with Virtual Capture Solution for Check Image Exchange", Apr. 7, 2005, SortLogic Systems, a Division of Omni-Soft, Inc., pp. 1-2.

"BancTec Unveils Image Quality Assurance Suite", Feb. 16, 2004, BancTec, Inc., http://www.banctec.com/PressRelease.cfm?PRID=174, pp. 1-3.

Holcomb, Notice 04-57, Aug. 27, 2004, Federal Reserve Bank of Dallas, 6 pages.

Microsoft Computer Dictionary, Fifth Edition, Microsoft Press, Copyright 2002, p. 258, 3 pages.

"CONIX Systems Launches Dupe Detective: New Product Eliminates Cost and Liability of Processing Items Multiple Times", Business Wire, May 18, 2006, 3 pages.

(56) References Cited

OTHER PUBLICATIONS

"Alogent Offering Sierra Solution for Image Cash Letter Deposits: Image Cash Letter and Back Office Conversion Capabilities Optimized for Large Merchants and Correspondent Banks", Business Wire, Oct. 10, 2005, p. 1, 2 pages.

"Taking Control of Payment Duplication: An In-Depth Look at a Serious Challenge Created by Check 21", Conix Systems, Inc., White Papers, Sep. 8, 2006, Retrieved Feb. 3, 2009, http://www.conix.com/news/default.asp, 9 pages.

Captovation Announces the Release of Check Capture 5.1; Newest Version of Check Imaging Software Includes Features to Facilitate Electronic Check Exchange and Presentment, Business Wire; New York, Aug. 10, 2006. p. 1, last accessed 20100509, available online.

3.Next Stop: image exchange?, ABA Banking Journal (0194-5947), 2003. vol. 95, Issue 11, p. 10.

"All My Papers tm, Creating Editing and Using Image Cash Letter. X9.37 Files." http://replay.web.archive.org/20060519041745/http://www.ggx.com/solutions_7.htm> retrieved Apr. 26, 2011 (6 pages).

* cited by examiner

Cover Page

Input File Name: PBIK1.DAT2.PBS.R1110.N0003.D051212.T16542.dat.10000000047199.12
Output File Name: PBIK1.DAT2.PBS.R1110.N0003.D051212.T16542.dat.10000000047199.12done
Item Count: 4546
IRD Requester Name: null
FED FED FED

↖ 1005

TO: DESTINATION ABA 102000199 (ANSI 8.3)
DESTINATION NAME
ADDRESS LINE 1 ↖ 1010
ADDRESS LINE 2
CITY, STATE AND ZIP CODE

BIN_____ SECTION :_____ COURIER :_____

---

INTENTIONALLY LEFT BLANK

Perforations

---

INTENTIONALLY LEFT BLANK

|  |  |  | BUNDLE SUMMARY A |  |  | RESTART PAGE NUMBER |  |  |
|---|---|---|---|---|---|---|---|---|
| FROM ABA (ANSI 9.4) | | FWD/RET COLLECTION TYPE (ANSI 9.9) | | CYCLE (ANSI 9.9) | | BUNDLE CREATION DATE (ANSI 9.60) | | |
| FROM 1020000199 | | COLLECTION TYPE 02 | CYCLE 5 | MM/DD/YYYY | | (PRINTED MM/DD/YYYY TIME 14:47) Page 1 of 3 | | |
| RT | Amount | ISN | RT | Amount | ISN | RT | Amount | ISN |
| 0021-2027 | 00000112.00 | 52962657 | 0021-2027 | 00000112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |

TO: BANK NAME  SECTION____BIN____
ADDRESS LINE 1
ADDRESS LINE 2
CITY, STATE AND ZIP CODE

BUNDLE ID (ANSI 9.7)    TO:  EP ABA (ANSI 8.3)    BUNDLE TOTAL AMOUNT (ANSI 27.4)
BUNDLE ID 428211900     TO:  101000048    FIRST  112.00    AMOUNT    1,079.10 ← 1110
FIRST ITEM IN BUNDLE/LAST ITEM IN BUNDLE    ITEM COUNT (SUM OF ANSI 24.2)
                                    LAST   112.00    ITEMS   162 ← 1105

BUNDLE SUMMARY A
FROM 1020000199  COLLECTION TYPE 02  CYCLE 5  MM/DD/YYYY  (PRINTED MM/DD/YYYY TIME 14:47) Page 2 of 3

| RT | Amount | ISN | RT | Amount | ISN | RT | Amount | ISN |
|---|---|---|---|---|---|---|---|---|
| 0021-2027 | 00000112.00 | 52962657 | 0021-2027 | 00000112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |

TO: BANK NAME  SECTION____BIN____    Perforations
ADDRESS LINE 1
ADDRESS LINE 2
CITY, STATE AND ZIP CODE
BUNDLE ID 428211900     TO:  101000048    FIRST  112.00    AMOUNT    1,079.10
                                    LAST   112.00    ITEMS   162

BUNDLE SUMMARY A
FROM 1020000199  COLLECTION TYPE 02  CYCLE 5  MM/DD/YYYY  (PRINTED MM/DD/YYYY TIME 14:47) Page 3 of 3

| RT | Amount | ISN | RT | Amount | ISN | RT | Amount | ISN |
|---|---|---|---|---|---|---|---|---|
| 0021-2027 | 00000112.00 | 52962657 | 0021-2027 | 00000112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |
| 0021-2027 | 112.00 | 52962657 | 0021-2027 | 112.00 | 52962657 | 0021-2027 | 112.00 | 52962657 |

TO: BANK NAME  SECTION____BIN____
BANK ADDRESS
CITY, STATE AND ZIP CODE
BUNDLE ID 428211900     TO:  101000048    FIRST  112.00    AMOUNT    1,079.10
                                    LAST   112.00    ITEMS   162

Fig. 11

CASH LETTER BUNDLE SUMMARY

FROM: 101000048 (ANSI 8.4)  PRINTED MM/DD/YYYY 14:49  PAGE X OF X
FRB KANSAS CITY  CYCLE 5 (ANSI 9.9)  CASH LETTER ID ( ANSI 8.10)

| BUNDLE ID (ANSI 9.7) | BUNDLE NO | ITEM COUNT (ANSI 24.2) | AMOUNT (ANSI 24.3) | BUNDLE ID (ANSI 9.7) | BUNDLE # | ITEM COUNT (ANSI 24.2) | AMOUNT (ANSI 24.3) |
|---|---|---|---|---|---|---|---|
| 0000123455 | 1 | 300 | 193456.00 | 0123123174 | 16 | 125 | 123123.56 |
| 0000123456 | 2 | 300 | 123456.00 | 0123123175 | 17 | 125 | 123123.56 |
| 0000123457 | 3 | 300 | 123456.00 | 0123123176 | 18 | 125 | 123123.56 |
| 0000123458 | 4 | 300 | 123456.00 | 0123123177 | 19 | 125 | 123123.56 |
| 0000123459 | 5 | 300 | 123456.00 | 0123123178 | 20 | 125 | 123123.56 |
| 0000123460 | 6 | 300 | 123456.00 | 0123123179 | 21 | 125 | 123123.56 |
| 0000123461 | 7 | 300 | 123456.00 | 0123123180 | 22 | 125 | 123123.56 |
| 0000123462 | 8 | 300 | 123456.00 | 0123123181 | 23 | 125 | 123123.56 |
| 0000123463 | 9 | 300 | 123456.00 | 0123123182 | 24 | 125 | 123123.56 |
| 0000123464 | 10 | 300 | 123456.00 | 0123123183 | 25 | 125 | 123123.56 |
| 0000123465 | 11 | 300 | 123456.00 | 0123123184 | 26 | 125 | 123123.56 |
| 0000123466 | 12 | 300 | 123456.00 | 0123123185 | 27 | 125 | 123123.56 |
| 0000123467 | 13 | 300 | 123456.00 | 0123123186 | 28 | 125 | 123123.56 |
| 0000123468 | 14 | 300 | 123456.00 | 0123123187 | 29 | 125 | 123123.56 |
| 0000123469 | 15 | 300 | 123456.00 | 0123123188 | 30 | 125 | 123123.56 |

CASH LETTER BUNDLE SUMMARY

FROM: 101000048 (ANSI 8.4)  PRINTED MM/DD/YYYY 14:49  PAGE X OF X
FRB KANSAS CITY  CYCLE 5 (ANSI 9.9)  CASH LETTER ID ( ANSI 8.10)

| BUNDLE ID (ANSI 9.7) | BUNDLE NO | ITEM COUNT (ANSI 24.2) | AMOUNT (ANSI 24.3) | BUNDLE ID (ANSI 9.7) | BUNDLE # | ITEM COUNT (ANSI 24.2) | AMOUNT (ANSI 24.3) |
|---|---|---|---|---|---|---|---|
| 0000123470 | 31 | 300 | 123456.00 | | | | |
| 0000123471 | 32 | 300 | 123456.00 | | | | |
| 0000123472 | 33 | 300 | 123456.00 | | | | |
| 0000123473 | 34 | 300 | 123456.00 | | | | |
| 0000123455 | 35 | 300 | 193456.00 | | | | |
| 0000123456 | 36 | 300 | 123456.00 | | | | |
| 0000123457 | 37 | 300 | 500999.99 | | | | |

Perforations

CASH LETTER BUNDLE SUMMARY

****** COLLECTION TYPE - 01 ******

BIN_____  SECTION :_____  COURIER :_____

FROM: 101000048
    FRB KANSAS CITY

TO: DESTINATION ABA 102000199    (ANSI 8.3)
    DESTINATION NAME
    ADDRESS LINE 1
    ADDRESS LINE 2
    CITY, STATE AND ZIP CODE         1ST BUNDLE      193,456.00
                                     LAST BUNDLE     500,999.99
CASH LETTER TOTALS                   CYCLE DATE      MM/DD/YY   (ANSI 8.5)
ITEMS              4546 ← 1305       CASH LETTER ID  12345678   (ANSI 8.10)
AMOUNT       1,777,456.99 ← 1310     FED WORK TYPE              (ANSI 8.13)
BUNDLES              46

RESTART PAGE NUMBER

\* \* \* \* \* \* \* EXCEPTION REPORT PAGE \* \* \* \* \* \* \*
IRD Print Summary                    PAGE X OF X
Failed IRD Print Listing

| RT | Sequence | Amount | Bundle ID | Reason |
|---|---|---|---|---|
| 241076770 | 007858551424 | 100.00 | 4242119000 | Digit Error in Required Field |
| 451478524 | 008348525452 | 4432.00 | 5845844581 | No Image Data |
| 467854545 | 014525841258 | 3110.00 | 5845844581 | No Image Data |

↑
INTENTIONALLY LEFT BLANK

Perforations
↓

INTENTIONALLY LEFT BLANK

IDENTIFYING DUPLICATE PRINTED PAPER CASH LETTERS

RELATED PATENT APPLICATIONS

This patent application is related to U.S. patent application Ser. No. 11/362,344, entitled "Cash Letter Print Streams With Audit Data," filed Feb. 22, 2006, which claims priority under 35 U.S.C. §119 to U.S. Provisional Patent Application No. 60/710,346, entitled "Image Replacement Document (IRD) Print Streams with Real-Time Audit Data," filed Aug. 22, 2005, and U.S. Provisional Patent Application No. 60/657,142, entitled "Check Processing Using Substitute Check Images," filed Feb. 28, 2005. This patent application also is related to co-pending U.S. patent application Ser. No. 11/982,950, entitled "Cash Letter Print Verification," filed Nov. 6, 2007. The complete disclosure of the above-identified applications is hereby fully incorporated herein by reference.

FIELD OF THE INVENTION

The invention relates generally to monitoring paper cash letter production and more particularly to verifying cash letter printing and identifying duplicate printed paper cash letters.

BACKGROUND OF THE INVENTION

Effective Oct. 28, 2004, the Check Clearing for the 21st Century Act ("the Act") improves the ability of banks to use electronic images of paper checks by, for example, submitting those images, along with associated information, for electronic processing. Under the Act, if a receiving financial institution ("RI") or its customer requires a paper check, a paper image replacement document ("IRD"), such as a paper "substitute check," may be created from an electronic check image and associated electronic information. Under the Act, a substitute check meeting specified requirements is the legal equivalent of an original paper check, and an RI is required to accept the substitute check for payment. This process enables banks to reduce the costs and inconveniences associated with physically handling and transporting original paper checks.

Under the Act, the substitute check must be essentially an exact copy of the original paper check to be the legal equivalent of the original paper check. In particular, the substitute check must include an exact copy of all of the Magnetic Ink Character Recognition ("MICR") data provided on the original paper check and all check endorsements.

The terms "substitute check" and "IRD" generally are used interchangeably herein to refer to any electronic or paper document that can be used for electronic payment processing purposes, whether or not the document is the legal equivalent of a paper check negotiable instrument. The terms "bank" and "RI" generally are used herein to refer to any party performing conventional or electronic check processing at any stage, including depositing and receiving institutions, their non-bank subsidiaries and affiliates, and any non-bank third party agents that provide processing services to banks.

A "cash letter" is a collection of one or more bundles of checks and/or IRDs (interchangeably collectively or individually referred to herein as "items") that can be transmitted from a bank to an RI. Further, as used herein, a "cash letter" can comprise return items. A cash letter typically includes a cover page comprising information regarding the cash letter's contents. For example, the cover page can comprise the number of items in the cash letter, information identifying the transmitting bank, and/or information identifying the RI. For each bundle of items in the cash letter, the cash letter can include a bundle summary comprising the number of items in the bundle, the value of each of the items in the bundle, and the total value of all items in the bundle. The cash letter also can include a cash letter bundle summary comprising a total of the value of all the bundles in the cash letter.

A cash letter in electronic form, comprising images of the items and associated financial data, is referred to herein as an "image cash letter" or "ICL." A cash letter in paper form, comprising paper items, is referred to herein as a "paper cash letter." The cover page, bundle summaries, and cash letter bundle summary contained within a cash letter, whether paper or electronic, are collectively referred to herein as "audit data."

A bank can submit a cash letter to an RI either in electronic or paper form. For example, the bank can submit a paper cash letter to an RI via conventional paper transport means, such as mail or truck delivery. Alternatively, the bank can communicate an ICL to an RI via an electronic data transport means, such as a distributed computer network.

Conventionally, preparation of a paper cash letter, either by the submitting bank or the RI, generally required: (1) aggregating one or more bundles of paper items (either original paper checks, substitute checks, or other printed paper items); (2) printing a bundle summary for each bundle; (3) printing a cash letter bundle summary for the cash letter; (4) printing a cover page for the cash letter; and (5) assembling the cash letter by matching the items to their respective bundle summaries, matching the bundles to the cash letter bundle summary, and matching the items, bundle summaries, and cash letter bundle summary to the cover page. Such preparation involves many inefficiencies, most notably the delay involved in manually matching the items, bundle summaries, cash letter bundle summary, and cover page together to assemble the paper cash letter.

A recent approach for overcoming these inefficiencies includes producing print streams for efficiently generating properly formatted and ordered paper cash letters with substitute checks and audit data. Certain exemplary methods and systems for producing such print streams are described in co-pending U.S. patent application Ser. No. 11/362,344, entitled "Cash Letter Print Streams With Audit Data," the disclosure of which is hereby fully incorporated herein by reference. To date, banks have been unable to monitor the production of these print streams or the output of the corresponding paper cash letters.

In the traditional, paper processing arena, each paper cash letter component could be seen and touched throughout processing. Determining whether a paper cash letter was produced simply required looking in one or more trays at a bank processing station. Because Check 21 processing takes place electronically, banks do not have physical points at which they can make such determinations. Oftentimes, this inability results in failure of some paper cash letters to be produced and other paper cash letters to be printed two or more times.

Thus, a need exists in the art for a system and method for monitoring paper cash letter printing. Specifically, a need exists in the art for a system and method for verifying paper cash letter printing and for identifying duplicate printed paper cash letters.

SUMMARY OF THE INVENTION

The invention provides systems and methods for efficiently monitoring paper cash letter printing. Specifically, the invention provides systems and methods for verifying cash letter printing and identifying duplicate printed paper cash letters In a first record, a check presentment module stores information regarding each of multiple ICLs to be printed. For example, the stored information can include information uniquely identifying each of the ICLs, such as a total value of items in the cash letter, an American Bankers Association ("ABA") number of a bank that will receive a printed copy of the cash letter, a total number of item bundles in the cash letter, and a total number of items in the cash letter. The check presentment module generates a print stream for printing each of the ICLs.

Included within the print stream is information for printing a machine-readable identifier, such as a barcode, for each of the ICLs. The machine-readable identifier includes information uniquely identifying the ICL associated therewith. For example, the machine-readable identifier can include at least a portion of the information stored in the first record.

At least a portion of the ICLs are printed. Each printed ICL includes its corresponding machine-readable identifier. For example, a cover page of each printed ICL can include a barcode associated with the printed ICL.

Upon printing, information from each of the machine-readable identifiers is read. The check presentment module stores information from the machine-readable identifiers in a second record. To determine whether all of the ICLs have been printed, the check presentment module compares the information stored in the first record with the information stored in the second record. For example, if the first record includes information regarding an ICL, which is not identified in the second record, then the check presentment module can determine that the ICL has not been printed.

In certain exemplary embodiments, the check presentment module can output an alert to notify an operator that the ICL has not been printed. For example, the alert can include information uniquely identifying the ICL.

To determine whether a printed ICL is a duplicate, i.e., whether the ICL has been printed two or more times, a check presentment module can compare information from a machine-readable identifier of the printed ICL with information stored in the second record. If information identifying the ICL already exists in the second record, then the check presentment module can determine that the ICL already has been printed, and thus, is a duplicate. In certain exemplary embodiments, the check presentment module can output an alert to notify an operator that the ICL is a duplicate. For example, the alert can include information uniquely identifying the ICL.

These and other aspects, objects, features, and advantages of the invention will become apparent to those skilled in the art upon consideration of the following detailed description of illustrated exemplary embodiments, which include the best mode of carrying out the invention as presently perceived.

BRIEF DESCRIPTION OF THE DRAWINGS

FIG. 10 is a block diagram depicting a cover page printed from a print stream generated in accordance with an exemplary embodiment of the invention.

FIG. 11 is a block diagram depicting a bundle summary page printed from a print stream generated in accordance with an exemplary embodiment of the invention.

FIG. 13 is a block diagram depicting a cash letter bundle summary page printed from a print stream generated in accordance with an exemplary embodiment of the invention.

FIG. 14 is a block diagram depicting an exception report page printed from a print stream generated in accordance with an exemplary embodiment of the invention.

DETAILED DESCRIPTION OF EXEMPLARY EMBODIMENTS

The invention is directed to systems and methods for processing checks under the Check Processing Under the Check Clearing For The 21$^{st}$ Century Act ("the Act"). In particular, the invention is directed to systems and methods for producing print streams for efficiently generating properly formatted and ordered paper cash letters comprising substitute checks and audit data. By using expanded fields (also referred to herein as "expanded mass data sets") of a financial data file, each substitute check can comprise all of the MICR data and addenda data provided on a corresponding, original paper check. Thus, each substitute check can comprise all of the information necessary to comply with the requirements of the Act.

In accordance with an exemplary embodiment of the invention, a print stream file can comprise electronic form definitions for each document to be printed in the cash letter. For example, the cash letter documents can include a cover page, one or more bundles of substitute checks, a bundle summary for each substitute check bundle, a cash letter bundle summary, and/or an exception report page. A check presentment module can parse and store information from an electronic image cash letter file in data fields of the print stream file's electronic form definitions. Printing the information in the print stream file results in a properly formatted and ordered paper cash letter comprising substitute checks and audit data. The audit data comprises the cover page, bundle summary(ies), cash letter bundle summary, and/or exception report page, which can each detail the documents printed concurrently therewith.

The invention comprises a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

Turning now to the drawings, in which like numerals indicate like elements throughout the figures, exemplary embodiments of the invention are described in detail.

Figure 1:
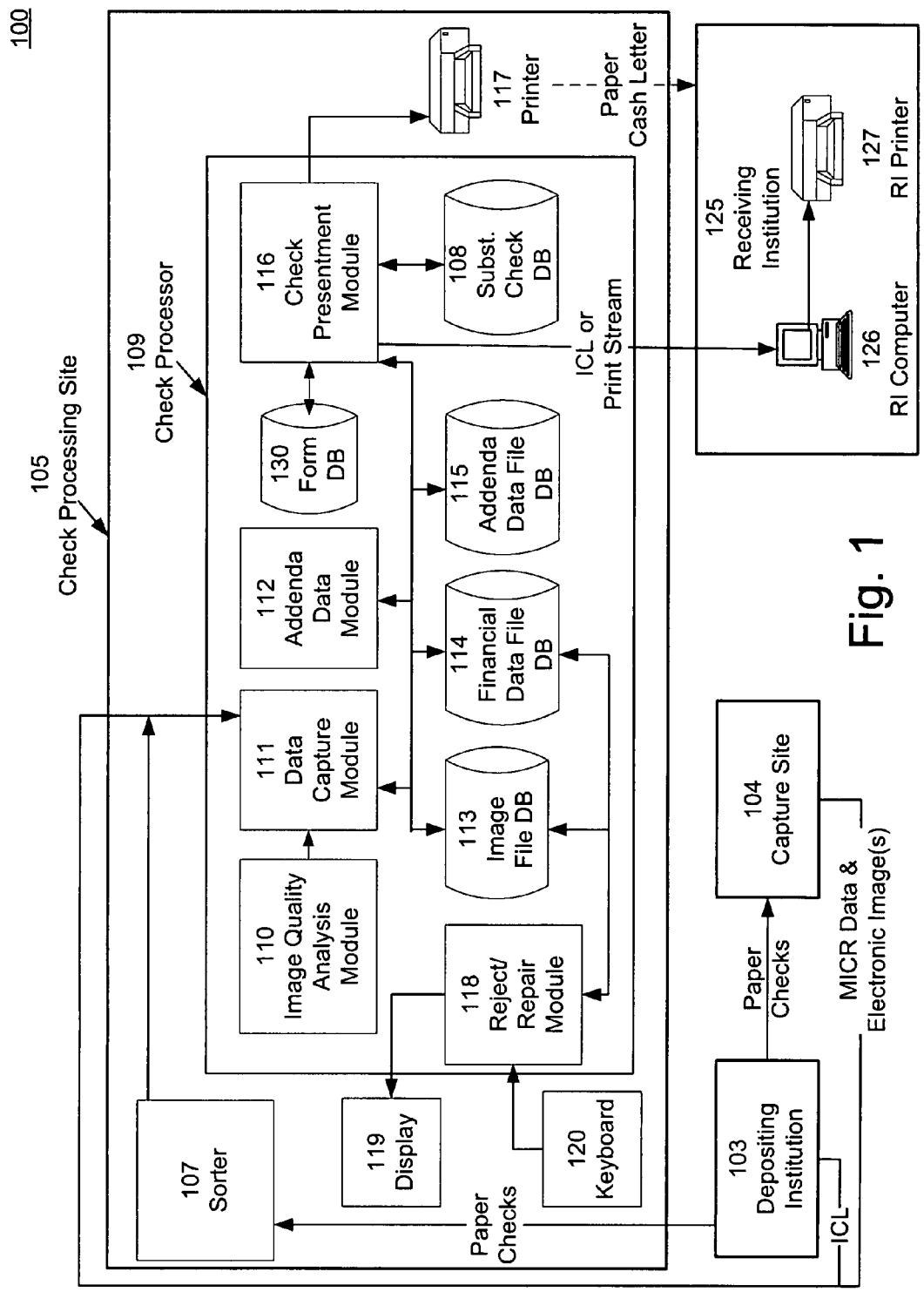
FIG. 1 is a block diagram depicting a system for processing checks, according to an exemplary embodiment of the invention.
Figure 2:
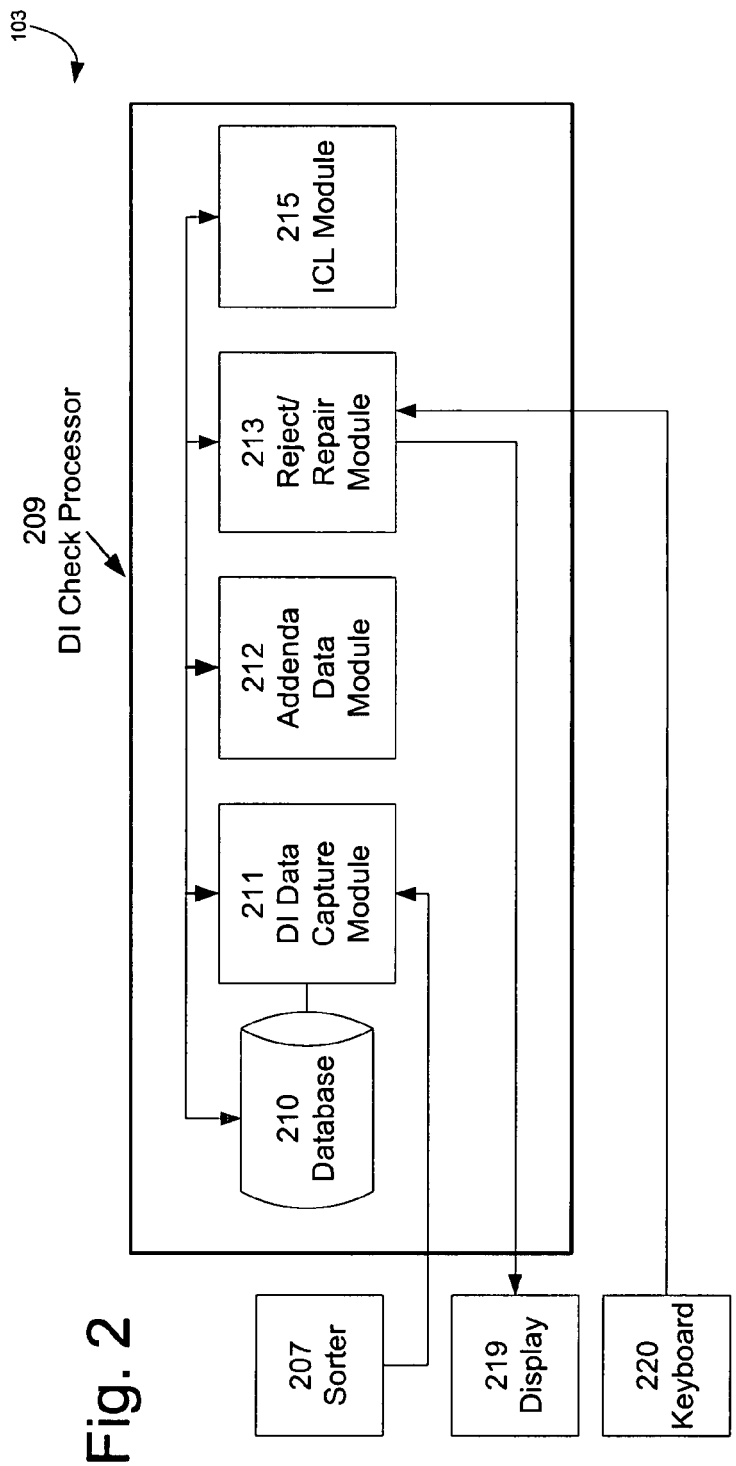
FIG. 2 is a block diagram depicting a depositing institution of a system for processing checks, according to an exemplary embodiment of the invention.
Figure 3:
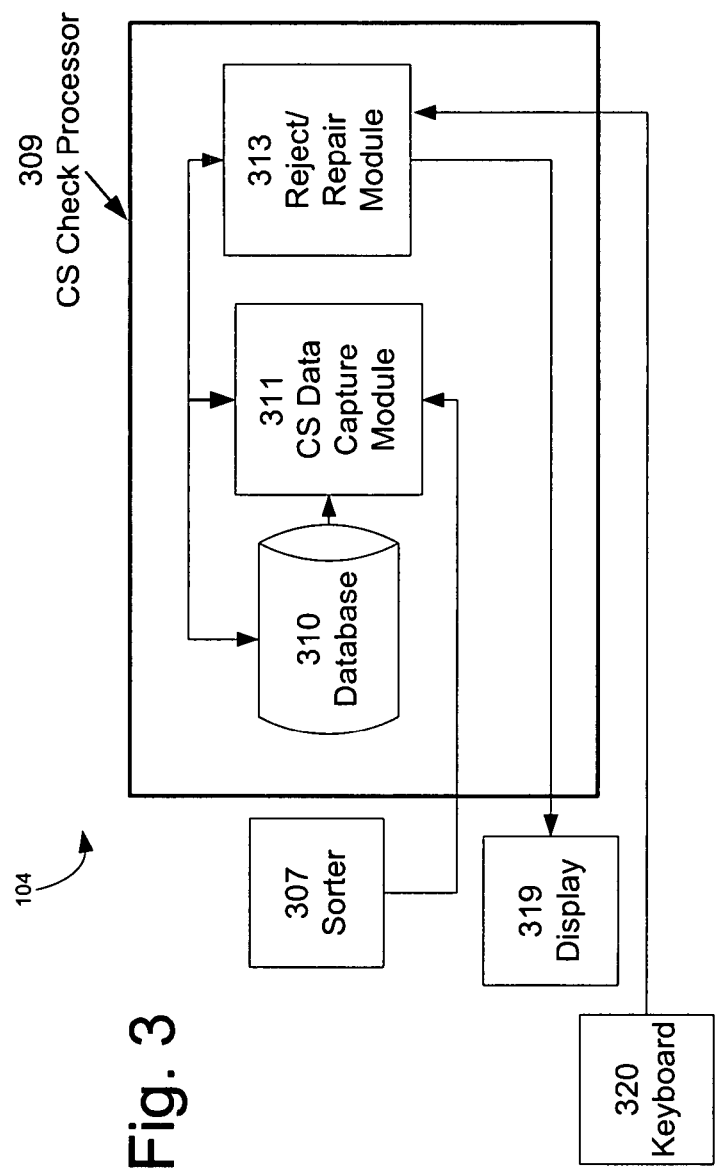
FIG. 3 is a block diagram depicting a capture site of a system for processing checks, according to an exemplary embodiment of the invention.

An exemplary system for processing checks will now be described with reference to FIGS. 1-3. FIG. 1 is a block diagram depicting a system 100 for processing checks, according to an exemplary embodiment of the invention. FIG. 2 is a block diagram depicting a depositing institution 103 of the system 100, according to an exemplary embodiment of the invention. FIG. 3 is a block diagram depicting a capture site 104 of the system 100, according to an exemplary embodiment of the invention.

The system 100 comprises various financial institutions and computer systems involved in check processing. In particular, the system 100 comprises the depositing institution 103, the capture site 104, a check processing site 105, and a receiving institution 125. The depositing institution 103 collects paper checks from a customer. Then, the depositing institution 103 can bundle the paper checks in one or more paper cash letters. Each paper cash letter can comprise one or more bundles of original paper checks and paper image replacement documents, such as substitute checks. The depositing institution 103 forwards the paper checks to the capture site 104 or the check processing site 105 for electronic processing.

Alternatively, the depositing institution 103 can itself generate an electronic image cash letter ("ICL") based on the paper checks. The depositing institution 103 can forward the generated ICL to the check processing site 105 for electronic processing. The ICL can be an electronic file that complies with the American National Standards Institute Specifications for Electronic Exchange of Check and Image Data (ANSI X9.37/X9.100), or other appropriate industry standards, as may change from time to time. The ICL can comprise, for each paper check, one or more electronic images of the check, all of the complete MICR data provided on the check, and additional financial data related to the check.

The ICL can further comprise a series of records related to the checks. For example, for each bundle of checks in the ICL, the ICL can include a bundle summary control record comprising information about the bundle, such as a bundle identification number, the number of items in the bundle, the value of each of the checks in the bundle, and the total value of all the checks in the bundle. The ICL also can comprise a cover page control record comprising information about the origin and destination of the ICL, and a cash letter bundle summary control record comprising a summary of all bundle summary control records in the ICL.

Thus, in alternative embodiments of the invention, the depositing institution 103 can (1) generate an ICL for received checks and forward the ICL to the check processing site 105, (2) forward received paper checks to the capture site 104, or (3) forward received paper checks to the check processing site 105.

The following description discusses an embodiment in which the depositing institution 103 forwards received paper checks to the check processing site 105 via a conventional paper cash letter. The check processing site 105 receives the paper checks from the depositing institution 103. A sorter 107 of the check processing site 105 electronically captures financial data from each received paper check. The sorter 107 comprises an image capture device (not shown), such as a scanner or camera, which captures at least one electronic image of each check. For example, the sorter 107 can capture, for each check, an image of the front of the check and an image of the back of the check. Upon image capture, the sorter 107 forwards each image to a data capture module 111 of a check processor 109 for further processing. The data capture module 111 stores the electronic image(s) in one or more image files, which the data capture module 111 maintains in an image file database 113 of the check processor 109. In one exemplary embodiment of the invention, the sorter 107 and the data capture module 111 can be part of the same physical unit.

The sorter 107 further comprises a MICR reader (not shown) that reads the MICR data from each check. Upon reading the MICR data, the sorter 107 identifies additional financial data related to the check, which is incidental to the processing of the check. For example, the sorter 107 can identify a unique item sequence number, a check processing site identifier, a processing date, a check amount, and/or a routing transit number of the depositing institution 103. The MICR data and additional financial data are collectively referred to herein as "financial data." The sorter 107 forwards the financial data to the data capture module 111 for further processing.

The data capture module 111 stores a form financial data file with multiple fields. For example, the data capture module 111 can store the form financial data file with data fields labeled F1-F7 and F10-F12. The data capture module 111 reads the financial data from the sorter 107 and parses and stores portions of the financial data in each of the data fields. For example, the data stored in fields F1-F7 of the financial data file can comprise the check amount stored in field F1, process control data stored in field F2, an account number stored in field F3, a check number stored in field F4, a payor bank's routing transit number stored in field F5, an external processing code stored in field F6, and "auxiliary on us" data stored in field F7. Fields F2-F4 are collectively referred to herein as the "on us field." The data in the on us field is referred to herein as "on us data."

Each of fields F1-F7 is respectively designed to accommodate a set number of characters without extraneous information such as dashes and field delimiters or other items. Accordingly, prior to storing the financial data in the respective fields of the financial data file, the data capture module 111 truncates all extraneous information and all data beyond the allowed number of characters in each of those fields. The data capture module 111 typically truncates the data in fields F2, F3, F4, and F7.

The data stored in fields F10-F11 can comprise untruncated financial data. For example, the data stored in fields F10-F11 can comprise untruncated on us data stored in field F10 and untruncated auxiliary on us data stored in field F11.

Thus, the fields of the financial data file can comprise all of the MICR data from the original paper check.

The check processor 109 also comprises an image quality analysis module 110, which can evaluate the quality of each captured check image. Certain exemplary systems and methods for performing such an evaluation are described in co-pending U.S. patent application Ser. No. 11/079,120, entitled "Assessing Electronic Image Quality," the disclosure of which is hereby fully incorporated herein by reference. The image quality analysis module 110 communicates the results of the evaluation to the data capture module 111. The data capture module 111 stores the image quality analysis results in a field of the financial data file, such as field F12. Then, the data capture module 111 stores the financial data file in a financial data file database 114 of the check processor 109.

In one embodiment of the invention, the image quality analysis module 110 can store additional data related to the image quality analysis results in field F12 of the financial data file. For example, the image quality analysis module 110 can store a reason for an image quality analysis result in field F12. In addition, an indicator can be stored in field 12 to indicate whether the image(s) corresponding to the data in field F12 has(have) corresponding addenda data.

The functionality of the data capture module 111 is described in more detail below with reference to FIGS. 5A and 5B.

The check processor 109 further comprises an addenda data module 112, which generates and/or captures electronic addenda data for each check. For example, the addenda data can comprise a bank endorsement. The addenda data module 112 inputs the addenda data into one or more addenda data files. The addenda data module 112 stores the addenda data file(s) in an addenda data file database 115 of the check processor 109.

For each check, the data capture module 111 associates the corresponding image file(s), financial data file, and addenda data file(s) for further processing. For example, the data capture module 111 can associate the image file(s), the financial data file, and the addenda data file(s) for a check with a common sequence number, identification number, or other suitable data link known in the art.

The check processor 109 further comprises a reject/repair module 118, which can verify, for each check, the contents of the image file(s) and the financial data file. The reject/repair module 118 analyzes the financial data file for errors. For example, the reject/repair module 118 might detect an error if a field of the financial data file is empty or if it comprises a character or string that is not in the proper format. If an error is detected, the reject/repair module 118 presents the image file(s) and certain of the associated financial data from the financial data file on a display 119 for viewing by a user. In an exemplary embodiment, the display 119 can be a computer monitor or another device suitable for presenting images and textual data to the user.

The reject/repair module 118 presents the financial data from fields F1, F5, and F6 of the financial data file on the display 119. The reject/repair module 118 also presents the complete on us data from field F10 in place of the truncated on us data in data fields F2, F3, and F4 on the display 119. The reject/repair module 118 further presents the complete auxiliary on us data from field F11 in place of the truncated auxiliary on us data in data field F7 on the display 119. Thus, the display 119 presents the user with the complete MICR data from the original paper check.

The user compares the presented financial data with the presented image file(s) and corrects any errors in the financial data via a keyboard 120 or other suitable input device known in the art. For example, where a displayed data field is empty or incorrect but the displayed image of the check comprises data corresponding to the data field, the user can enter the financial data from the displayed image into the displayed data field.

Then, the reject/repair module 118 stores the complete, corrected auxiliary on us data displayed in field F7 in field F11 of the financial data file. The reject/repair module 118 further stores the complete, corrected on us data displayed in fields F2, F3, and F4 in field F10 of the financial data file. In one embodiment of the invention, the reject/repair module 118 truncates the data in each corrected field, in accordance with the requirements of each of data fields F2, F3, F4, and F7. Then, the reject/repair module 118 stores the corrected, truncated data in the corresponding fields of the financial data file.

The functionality of the reject/repair module 118 is described in more detail below with reference to FIGS. 6A and 6B.

The check processor 109 further comprises a check presentment module 116, which is operable to present each received check to the receiving institution 125 for payment. The check presentment module 116 can generate a substitute check file for each check. In an exemplary embodiment, the substitute check file can comprise the check's electronic image(s), the check's financial data, and the check's addenda data. The check presentment module 116 stores the substitute check file in a substitute check database 108 of the check processor 109.

The check presentment module 116 can create at least one ICL comprising the substitute check file(s). Depending on the preferences of the receiving institution 125, the check presentment module 116 can present the ICL electronically or via paper. For example, the check presentment module 116 can electronically transmit the ICL via a network (not illustrated) to an RI computer 126 of the receiving institution 125.

Alternatively, the ICL can be locally or remotely printed for paper delivery. For example, the check presentment module 116 can locally print the ICL on a printer 117 of the check processing site 105. The check presentment module 116 can prepare a print stream comprising the ICL. The check presentment module 116 can transmit the print stream to the printer 117 for printing. An operator at the check processing site 105 can collect one or more of the printed ICLs for delivery to the receiving institution 125. Alternatively, the check presentment module 116 can generate, and transmit to the receiving institution 125, a print stream by which the receiving institution 125 can print the ICL on an RI Printer 127.

In an alternative exemplary embodiment of the invention, the check presentment module 116 can generate an ICL print stream without first generating an ICL or a substitute check file. The check presentment module 116 can collect data directly from the image file database 113, the financial data file database 114, and/or the addenda data file database 112 for creation of the print stream. The check presentment module 116 can store the collected data in pre-defined fields of a print stream file and transmit the print stream file to the printer 117 or the RI printer 127 for printing.

The functionality of the check presentment module 116 is described in more detail below with reference to FIG. 8.

A person of skill in the art will recognize that the image file database 113, the financial data file database 114, the addenda data file database 115, and the substitute check database 108 can be part of the same physical unit, a single database, or separate components.

In an alternative exemplary embodiment, the depositing institution 103 can forward original or substitute paper checks to the capture site 104 associated with the check processing site 105. Although only one capture site 104 is illustrated in FIG. 1, multiple capture sites can be associated with the check processing site 105. The capture site 104 can perform the check image and financial data capture process and can forward the captured images and data to the check processing site 105.

The capture site 104 receives paper checks from the depositing institution 103 and processes each paper check via a sorter 307. The sorter 307 comprises an image capture device (not shown), such as a scanner or camera, which captures at least one electronic image of each check. For example, the sorter 307 can capture, for each check, an image of the front of the check and an image of the back of the check. Upon image capture, the sorter 307 forwards each image to a CS data capture module 311 of a CS check processor 309 for further processing. The CS data capture module 311 stores the electronic image(s) in one or more image files, which the CS data capture module 311 maintains in a database 310 of the CS check processor 309.

The sorter 307 further comprises a MICR reader (not shown) that reads the MICR data from each check. Upon reading the MICR data, the sorter 307 identifies additional financial data related to the check, which is incidental to the processing of the check. For example, the sorter 307 can identify a unique item sequence number, a check processing site identifier, a processing date, a check amount, and/or a routing transit number of the depositing institution 103. The sorter 307 forwards the financial data to the CS data capture module 311 for further processing. In one exemplary embodiment of the invention, the sorter 307 and the CS data capture module 311 can be part of the same physical unit.

The CS data capture module 311 stores a form financial data file with multiple fields. For example, the CS data capture module 311 can store the form financial data file with fields F1-F7 and F10-F12. The CS data capture module 311 reads the financial data from the sorter 307 and parses and stores portions of the financial data in each of the data fields. For example, the CS data capture module 311 can store truncated financial data in fields F1-F7 of the financial data file. The CS data capture module 311 can further store untruncated financial data in fields F10-F11 of the financial data file. The fields of the financial data file can comprise all of the MICR data from the original paper check. The CS data capture module 311 stores the financial data file in the database 310.

The CS check processor 309 further comprises a reject/repair module 313, which can verify, for each check, the contents of the image file(s) and the financial data file. The reject/repair module 313 analyzes the financial data file for errors. For example, the reject/repair module 313 might detect an error if a field of the financial data file is empty or if it comprises a character or string that is not in the proper format. If an error is detected, the reject/repair module 313 presents the image file(s) and certain of the associated financial data from the financial data file on a display 319 for viewing by a user. In an exemplary embodiment, the display 319 can be a computer monitor or another device suitable for presenting images and textual data to the user.

The reject/repair module 313 presents the financial data from fields F1, F5, and F6 of the financial data file on the display 319. The reject/repair module 313 also presents the complete on us data from field F10 in place of the truncated on us data in fields F2, F3, and F4 on the display 319. The reject/repair module 313 further presents the complete auxiliary on us data from field F11 in place of the truncated auxiliary on us data in field F7 on the display 319. Thus, the display 319 presents a user with all of the MICR data from the original paper check.

The user compares the presented financial data with the presented image file(s) and corrects any errors in the financial data via a keyboard 320 or other suitable input device known in the art. For example, where a displayed data field is empty or incorrect but the displayed image of the check comprises data corresponding to the data field, the user can enter the financial data from the displayed image into the displayed data field.

Then, the reject/repair module 313 stores the complete, corrected auxiliary on us data displayed in field F7 in field F11 of the financial data file. The reject/repair module 313 further stores the complete, corrected on us data displayed in fields F2, F3, and F4 in field F10 of the financial data file. In one embodiment of the invention, the reject/repair module 313 can truncate the data in each corrected field, in accordance with the requirements of each of fields F2, F3, F4, and F7. Then, the reject/repair module 313 stores the corrected, truncated data in corresponding fields of the financial data file.

The functionality of the reject/repair module 313 is described in more detail below with reference to FIGS. 6A and 6B.

For each check, the CS data capture module 311 can forward the electronic image(s) of the check and the check's financial data to the data capture module 111 of the check processing site 105 for further processing, as discussed above with reference to FIG. 1. In this case, the forwarded data can be stored in the appropriate database(s) and can be accessed via the check presentment module 116 to prepare the requested form of presentment to the receiving institution 125. At the check processing site 105, the data capture module 111 processes the financial data and images for presentment to the receiving institution 125.

In another alternative exemplary embodiment, the depositing institution 103 can create an ICL based on the paper checks and can communicate the ICL to the check processing site 105. In this case, the depositing institution 103 can comprise components similar to those of the check processing site 105.

The depositing institution 103 processes paper checks at a sorter 207. The sorter 207 electronically captures information from each paper check. The sorter 207 comprises an image capture device (not shown), such as a scanner or camera, which captures at least one electronic image of each check. For example, the sorter 207 can capture, for each check, an image of the front of the check and an image of the back of the check. Upon image capture, the sorter 207 forwards each image to a DI data capture module 211 of a DI check processor 209 for further processing. The DI data capture module 211 can store the electronic image(s) in one or more image files, which the depositing institution data capture module 211 maintains in a database 210 of the DI check processor 209. In one exemplary embodiment of the invention, the sorter 207 and the DI data capture module 211 can be part of the same physical unit.

The sorter 207 further comprises a MICR reader (not shown) that reads the MICR data from each check. Upon reading the MICR data, the sorter 207 identifies additional financial data related to the check, which is incidental to the processing of the check. For example, the sorter 207 can identify a unique item sequence number, a check processing site identifier, a processing date, a check amount, and/or a routing transit number of the depositing institution 103. The sorter 207 forwards the financial data to the DI data capture module 211 for further processing.

The DI data capture module 211 stores a form financial data file with multiple fields. For example, the DI data capture module 211 can store the form financial data file with fields F1-F7 and F10-F12. The DI data capture module 211 reads the financial data from the sorter 207 and parses and stores portions of the financial data in each of the data fields. For example, the DI data capture module 211 can store truncated financial data in fields F1-F7 of the financial data file. The DI data capture module 211 can further store untruncated financial data in fields F10-F11 of the financial data file. The fields of the financial data file can comprise all of the MICR data from the original paper check. The DI data capture module 211 stores the financial data file in the database 210.

The DI check processor 209 further comprises an addenda data module 212, which generates and/or captures electronic addenda data for each check. For example, the addenda data can comprise a bank endorsement. The addenda data module 212 inputs the addenda data into one or more addenda data files. The addenda data module 212 stores the addenda data file(s) in the database 210.

For each check, the DI data capture module 211 associates the corresponding image file(s), financial data file, and addenda data file(s) for a check with a sequence number, identification number, or other suitable data link known in the art.

The DI check processor 209 further comprises a reject/repair module 213, which can verify, for each check, the contents of the image file(s) and the financial data file. The reject/repair module 213 analyzes the financial data file for errors. For example, the reject/repair module 213 might detect an error if a field of the financial data file is empty or if it comprises a character or string that is not in the proper format. If an error is detected, the reject/repair module 213 presents the image file(s) and certain of the associated financial data from the financial data file on a display 219 for viewing by a user. In an exemplary embodiment, the display 219 can be a computer monitor or another device suitable for presenting images and textual data to the user.

The reject/repair module 213 presents the financial data from fields F1, F5, and F6 of the financial data file on the display 219. The reject/repair module 213 also presents the complete on us data from field F10 in place of the truncated on us data in fields F2, F3, and F4 on the display 219. The reject/repair module 213 further presents the complete auxiliary on us data from field F11 in place of the truncated auxiliary on us data in field F7 on the display 219. Thus, the display 219 presents the user with the complete MICR data from the original paper check.

The user compares the presented financial data with the presented image file(s) and corrects any errors in the financial data via a keyboard 220 or other suitable input device known in the art. For example, where a displayed data field is empty or incorrect but the displayed image of the check comprises data corresponding to the data field, the user can enter the financial data from the displayed image into the displayed data field.

Then, the reject/repair module 213 stores the complete, corrected auxiliary on us data displayed in field F7 in field F11 of the financial data file. The reject/repair module 213 further stores the complete, corrected on us data displayed in fields F2, F3, and F4 in field F10 of the financial data file. In one embodiment of the invention, the reject/repair module 213 truncates the data in each corrected field, in accordance with the requirements of each of fields F2, F3, F4, and F7.

Then, the reject/repair module 213 stores the corrected, truncated data in the corresponding fields of the financial data file.

The functionality of the reject/repair module 213 is described in more detail below with reference to FIGS. 6A and 6B.

The DI check processor 209 further comprises an ICL module 215, which generates at least one ICL comprising information regarding one or more bundles of checks. Each bundle can comprise one or more checks. For each check, the ICL can include the electronic image(s) from the check's image file(s), the financial data from the check's financial data file, and the addenda data from the check's addenda data file.

The ICL can further comprise a series of records related to the checks. For example, for each bundle of checks in the ICL, the ICL can include a bundle summary control record comprising information about the bundle, such as a bundle identification number, the number of items in the bundle, the value of each of the checks in the bundle, and the total value of all the checks in the bundle. The ICL also can comprise a cover page control record comprising information about the origin and destination of the ICL, and a cash letter bundle summary control record comprising a summary of all bundle summary control records in the ICL. The DI check processor 209 can forward the ICL to the data capture module 111 of the check processing site 105 for further processing.

Those skilled in the art will appreciate that exemplary system 100 is merely representative of the components for processing checks. Other embodiments of the invention may not have all of the components identified in FIGS. 1-3 or can include additional components.

Figure 4:
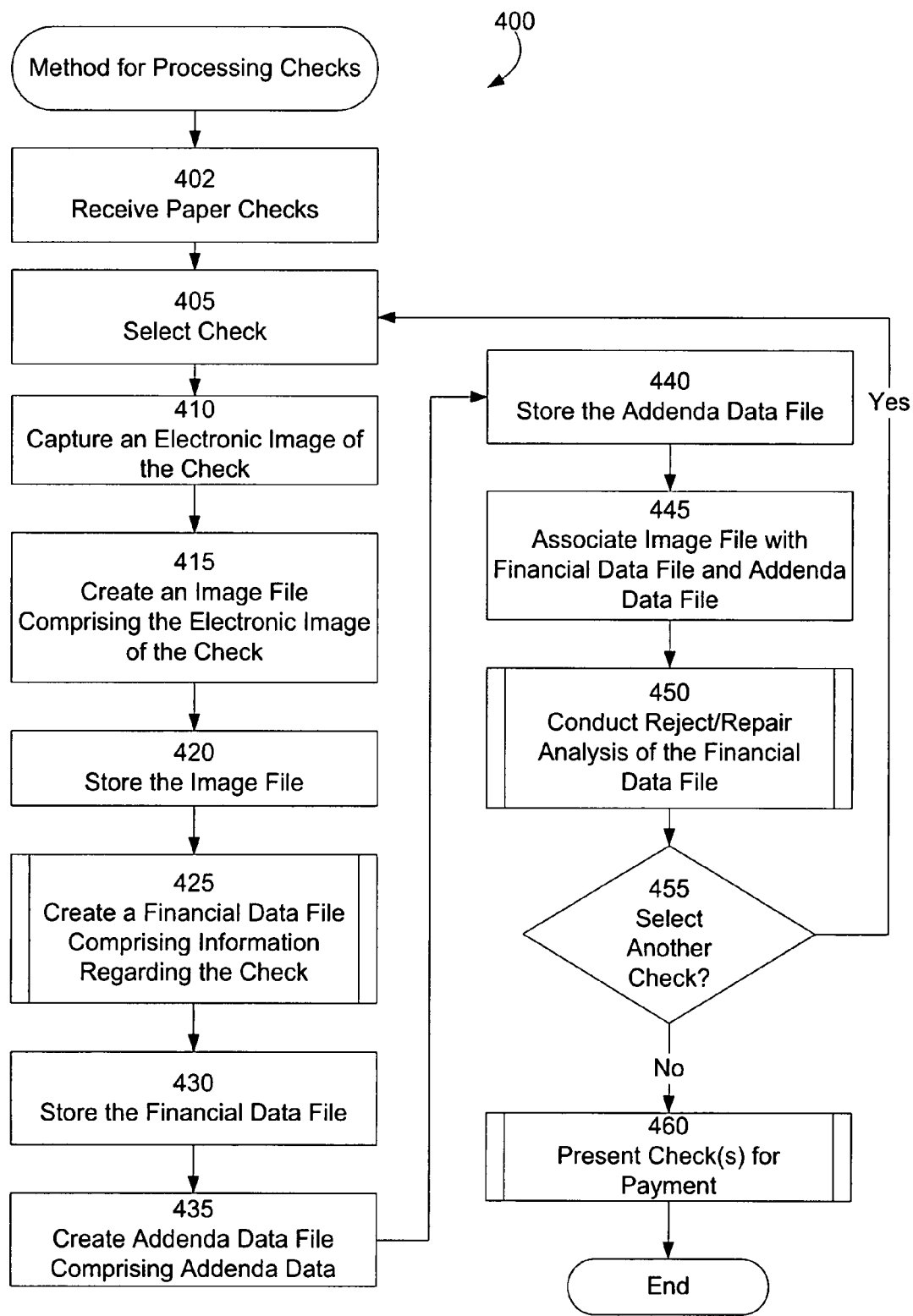
FIG. 4 is a flow chart depicting a method for processing checks, according to an exemplary embodiment of the invention.

FIG. 4 is a flow chart depicting a method 400 for processing checks, according to an exemplary embodiment of the invention. The exemplary method 400 is illustrative and, in alternative embodiments of the invention, certain steps can be performed in a different order, in parallel with one another, or omitted entirely, and/or certain additional steps can be performed without departing from the scope and spirit of the invention. The method 400 is described below with reference to FIGS. 1 and 4.

In step 402, the check processing site 105 receives a conventional paper cash letter comprising original and/or substitute paper checks from the depositing institution 103. At the check processing site 105, the paper checks are initially processed via the sorter 107. In step 405, the sorter 107 selects a check for processing. In step 410, the sorter 107 captures at least one electronic image of the check. In an exemplary embodiment, the sorter 107 captures an image of the front of the check and an image of the back of the check. In step 415, the sorter 107 communicates the captured electronic image(s) to the data capture module 111, which creates at least one image file comprising the electronic image(s). In step 420, the data capture module 111 stores the image file(s) in the image file database 113.

In step 425, the data capture module 111, in conjunction with the sorter 107 and the image quality analysis module 110, creates a financial data file comprising information regarding the check. For example, the financial data file can comprise the check's financial data and the results of an image quality analysis performed on the captured electronic image(s) of the check. Step 425 is described in more detail below with reference to FIG. 5. In step 430, the data capture module 111 stores the financial data file in the financial data file database 114.

In step 435, the addenda data module 112 creates an addenda data file comprising addenda data for the check. The addenda data module 112 can generate and/or capture the addenda data from the check. In an exemplary embodiment, the addenda data can comprise a bank endorsement, a check processing date, a processing sequence number, and/or an image quality record. In step 440, the addenda data module 112 stores the addenda data file in the addenda data file database 115.

In step 445, the data capture module 111 associates the check's image file(s), financial data file, and addenda data file(s) with each other. For example, the data capture module 111 can associate the image file(s), the financial data file, and the addenda data file(s) via a common sequence number, identification number, file name, or other suitable data link known in the art.

In step 450, the reject/repair module 118 conducts a reject/repair analysis of the check's financial data file. The reject/repair module 118 allows detection and correction of certain errors in the financial data file. Step 450 is discussed in more detail below with reference to FIGS. 6A and 6B.

In step 455, the sorter 107 determines whether to select another check for image/financial data capture. If so, the method 400 branches back to step 405 to repeat the image/financial data capture of another check. If the sorter 107 will not select another check, then the method 400 branches to step 460 to present the selected check(s) for payment. Step 460 is described in more detail below with reference to FIG. 7.

Figure 5A:
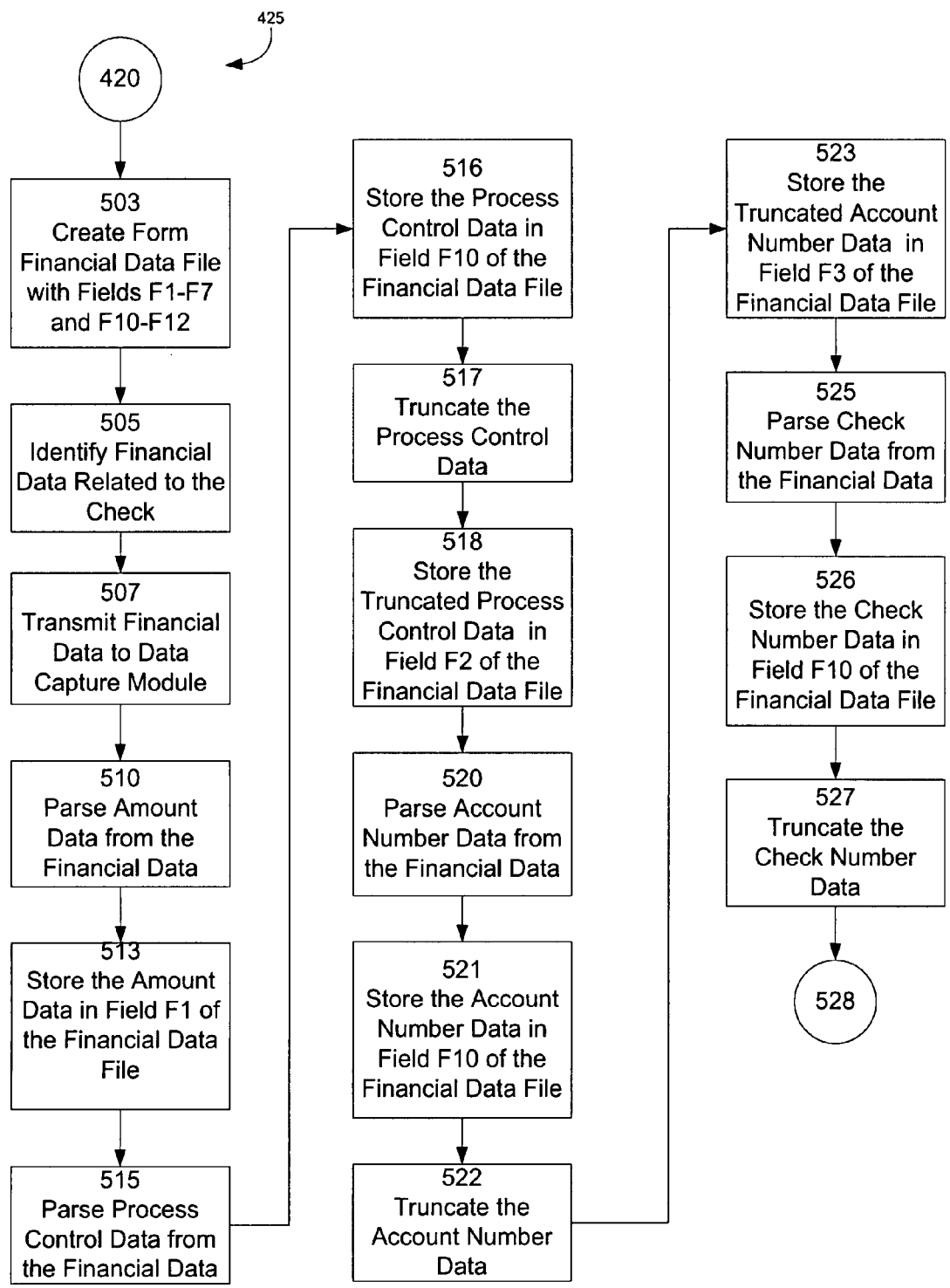
FIG. 5A and FIG. 5B are flow charts depicting a method for creating a financial data file comprising expanded mass data sets, according to an exemplary embodiment of the invention
Figure 5B:
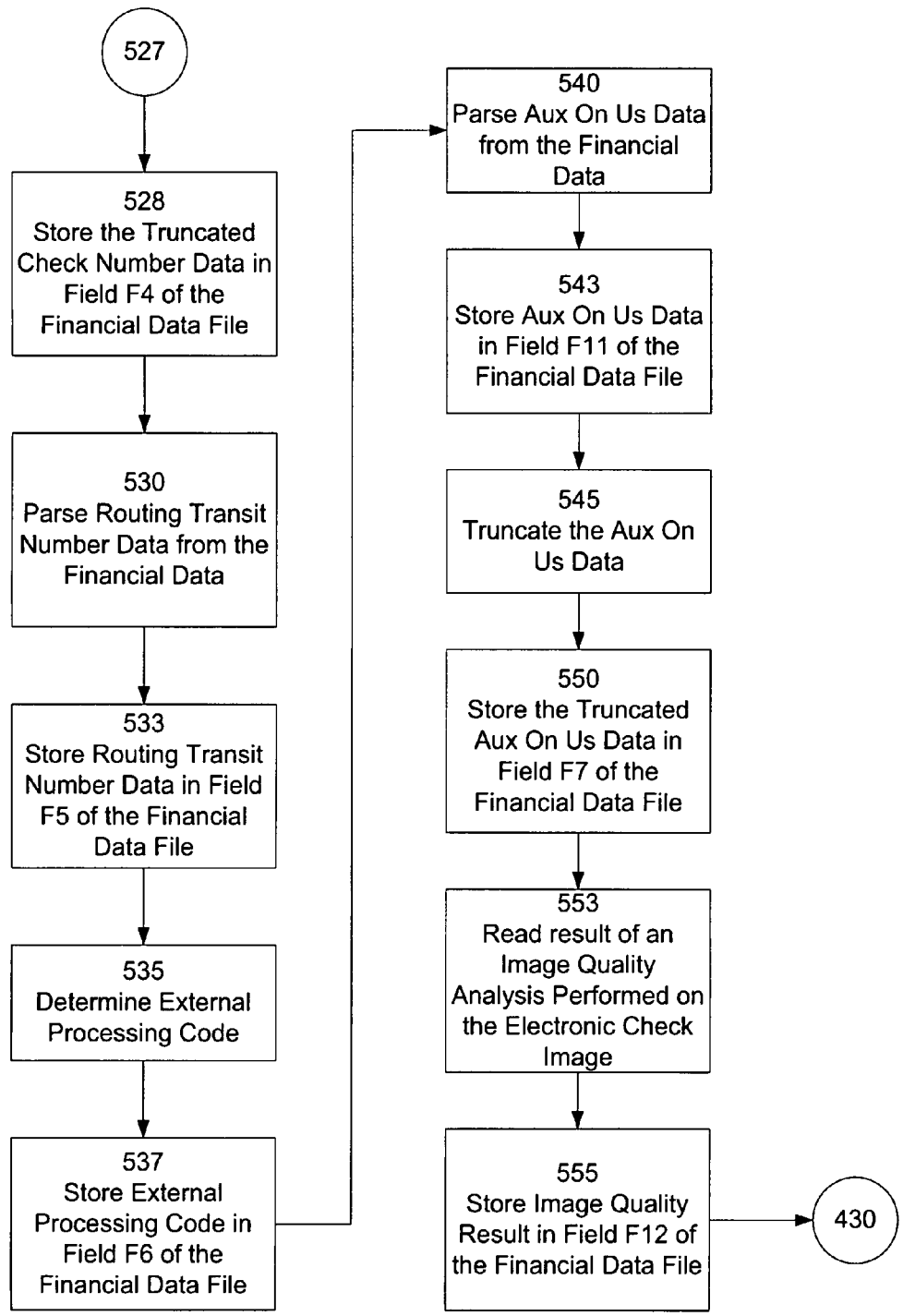

FIG. 5A and FIG. 5B are flow charts depicting a method 425 for creating a financial data file comprising expanded mass data sets, according to an exemplary embodiment of the invention, as referred to in step 425 of FIG. 4. The exemplary method 425 is merely illustrative and, in alternative embodiments of the invention, certain steps can be performed in a different order, performed in parallel with one another, or omitted entirely, and/or certain additional steps can be performed without departing from the scope and spirit of the invention. The method 425 is described below with reference to FIGS. 1 and 5.

In step 503, a form financial data file is created with fields F1-F7 and F10-F12, and the form financial data file is stored by the data capture module 111. The data capture module 111 can configure fields F1-F7 of the form financial data file to receive truncated financial data. For example, the data capture module 111 can designate that Field F2 cannot include any dashes or other extraneous characters. The data capture module 111 can further designate that Field F2 can receive only up to three bytes of data or a specified number of characters.

The fields F1-F7 correspond to the standard fields established by the American National Standards Institute Specifications for Electronic Exchange of Check and Image Data (ANSI X9.37/X9.100), which establish the specific type, format, and amount of data for each of those fields. Note that, in certain exemplary embodiments of the invention, the fields F1-F7 can correspond to other appropriate industry standards, as may change from time to time. For example, the data stored in the financial data file can comprise amount data stored in field F1, process control data stored in field F2, account number data stored in field F3, check number data stored in field F4, routing transit number data stored in field F5, an external processing code stored in field F6, and auxiliary on us data stored in field F7.

In step 505, the sorter 107 identifies financial data related to the paper check. For example, the sorter 107 can read MICR data from the check and can identify other financial data that is incidental to the processing of the check. The MICR data can comprise a check amount, process control data, account number data, check number data, a payor bank's routing transit number, and auxiliary on us data. Additionally, the sorter 107 can identify a unique item sequence number, a check processing site identifier, a processing date, and/or a routing transit number of the depositing institution 103.

In step 507, the sorter 107 transmits the identified financial data to the data capture module 111. In step 510, the data capture module 111 parses amount data from the financial data. The term "amount data" is used herein to refer to financial data that relates to the value of the check. For example, the amount data can comprise the U.S. dollar value of the check, which can be expressed in cents. In step 513, the data capture module 111 stores the amount data in field F1 of the financial data file created in step 503.

In step 515, the data capture module 111 parses process control data from the financial data. The term "process control data" is used herein to refer to a check number or transaction code that a bank uses to identify an item or a group of items. In step 516, the data capture module 111 stores the process control data in field F10 of the financial data file.

In step 517, the data capture module 111 truncates the process control data to remove extraneous characters such as dashes and to remove excess characters, as required by field F2. For example, if field F2 only can receive up to three bytes of data and the process control data is ten bytes long, the data capture module 111 can truncate seven bytes of data from the process control data. In step 518, the data capture module 111 stores the truncated process control data in field F2 of the financial data file.

In step 520, the data capture module 111 parses account number data from the financial data. The term "account number data" is used herein to refer to information related to the check payor's account at the receiving institution. In step 521, the data capture module 111 stores the account number data in field F10 of the financial data file, next to the process control data stored in field F10 in step 516. In exemplary embodiments, the account number data and the process control data in field F10 can be separated by a dash, colon, or other suitable separator.

In step 522, the data capture module 111 truncates the account number data to remove extraneous characters such as dashes and to remove excessive characters, as required by field F3. For example, if field F3 only can receive up to eight bytes of data and the account number data is ten bytes long, the data capture module 111 can truncate two bytes of data from the account number data. In step 523, the data capture module 111 stores the truncated account number data in field F3 of the financial data file.

In step 525, the data capture module 111 parses check number data from the financial data. The term "check number data" is used herein to refer to information that can be used to identify the check, including, e.g., a number or a sequence of letters, characters, and/or numbers. In step 526, the data capture module 111 stores the check number data in field F10 of the financial data file, next to the account number data stored in field F10 in step 521. For example, the check number data and the account number data in field F10 can be separated by a dash, colon, or other suitable separator.

In step 527, the data capture module 111 truncates the check number data to remove extraneous characters such as dashes and to remove excessive characters, as required by field F4. For example, if field F4 only can receive up to two bytes of data and the check number data is nine bytes long, the data capture module 111 can truncate seven bytes of data from the check number data. In step 528, the data capture module 111 stores the truncated check number data in field F4 of the financial data file.

In step 530, the data capture module 111 parses routing transit number data from the financial data. The term "routing transit number data" is used herein to refer to information that can be used to identify the bank by or through which the check is payable, including, e.g., a number or a sequence of letters, characters, and/or numbers. In step 533, the data capture module 111 stores the routing transit number data in field F5 of the financial data file.

In step 535, the data capture module 111 determines an external processing code for the check. The term "external processing code" is used herein to refer to information that can be used to uniquely identify a group of items. For example the external processing code can identify certain items as return items, certain items as substitute checks, and certain items as substitute checks for return items. In step 537, the data capture module 111 stores the external processing code in field F6 of the financial data file.

In step 540, the data capture module 111 parses auxiliary on us data from the financial data. The term "auxiliary on us data" is used herein to refer to information that can be used to uniquely identify a check. For example, the auxiliary on us data can comprise a serial number or other unique set of numbers, letters, and/or characters. In step 543, the data capture module 111 stores the auxiliary on us data in field F11 of the financial data file.

In step 545, the data capture module 111 truncates the auxiliary on us data to remove extraneous characters such as dashes and to remove excess characters, as required by field F7. For example, if field F7 can only receive up to six bytes of data and the auxiliary on us data is nine bytes long, the data capture module 111 can truncate three bytes of data from the auxiliary on us data. In step 550, the data capture module 111 stores the truncated auxiliary on us data in field F7 of the financial data file.

In step 553, the data capture module 111 reads at least one result of an image quality analysis performed on the electronic image(s) of the check. In step 555, the data capture module 111 stores the image quality analysis result(s) in field F12 of the financial data file. The method 425 then branches to step 430 (FIG. 4).

Figure 6A:
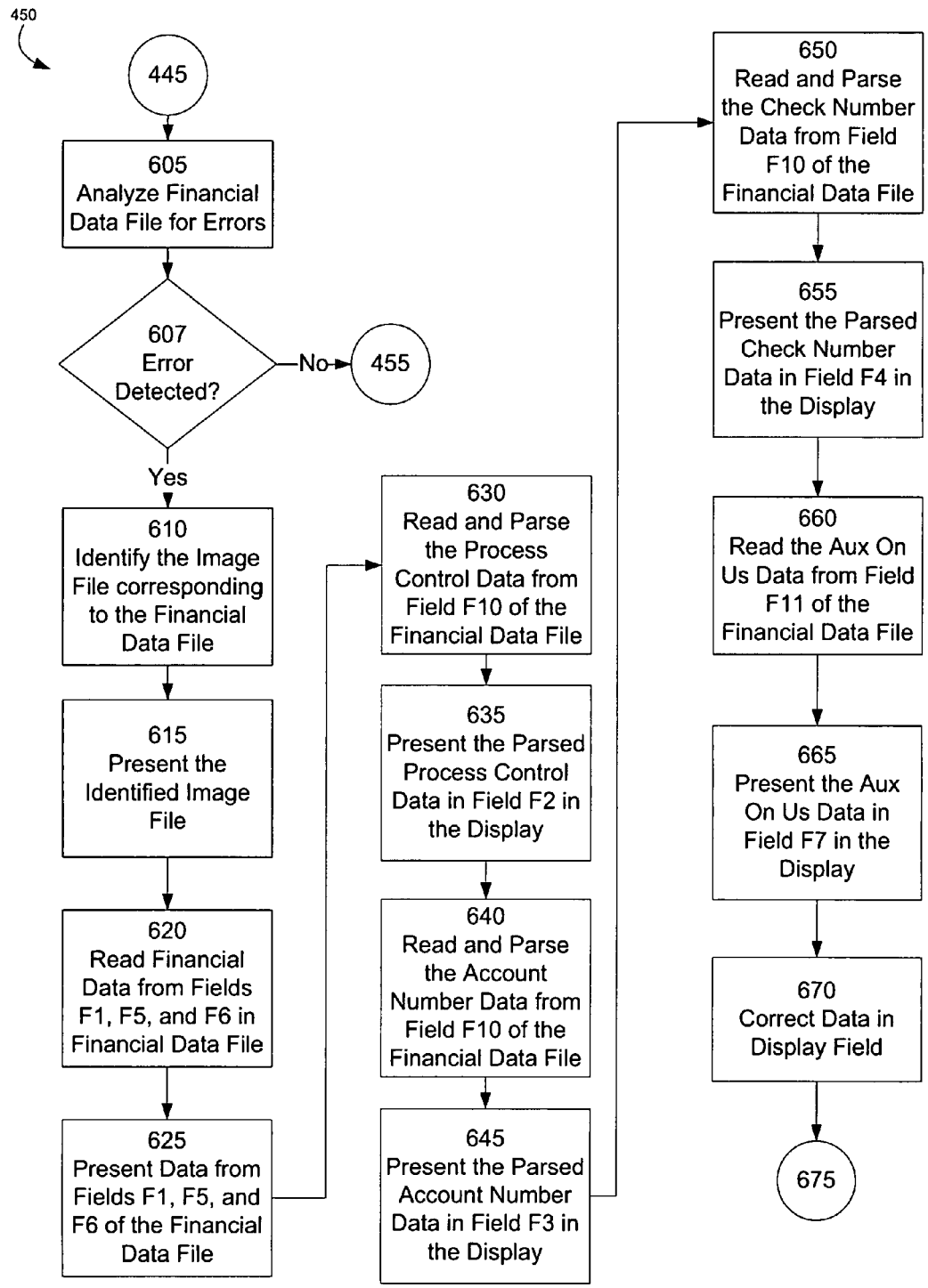
FIG. 6A and FIG. 6B are flow charts depicting a method for conducting a reject/repair analysis of a financial data file using expanded mass data sets of the financial data file, according to an exemplary embodiment of the invention.
Figure 6B:
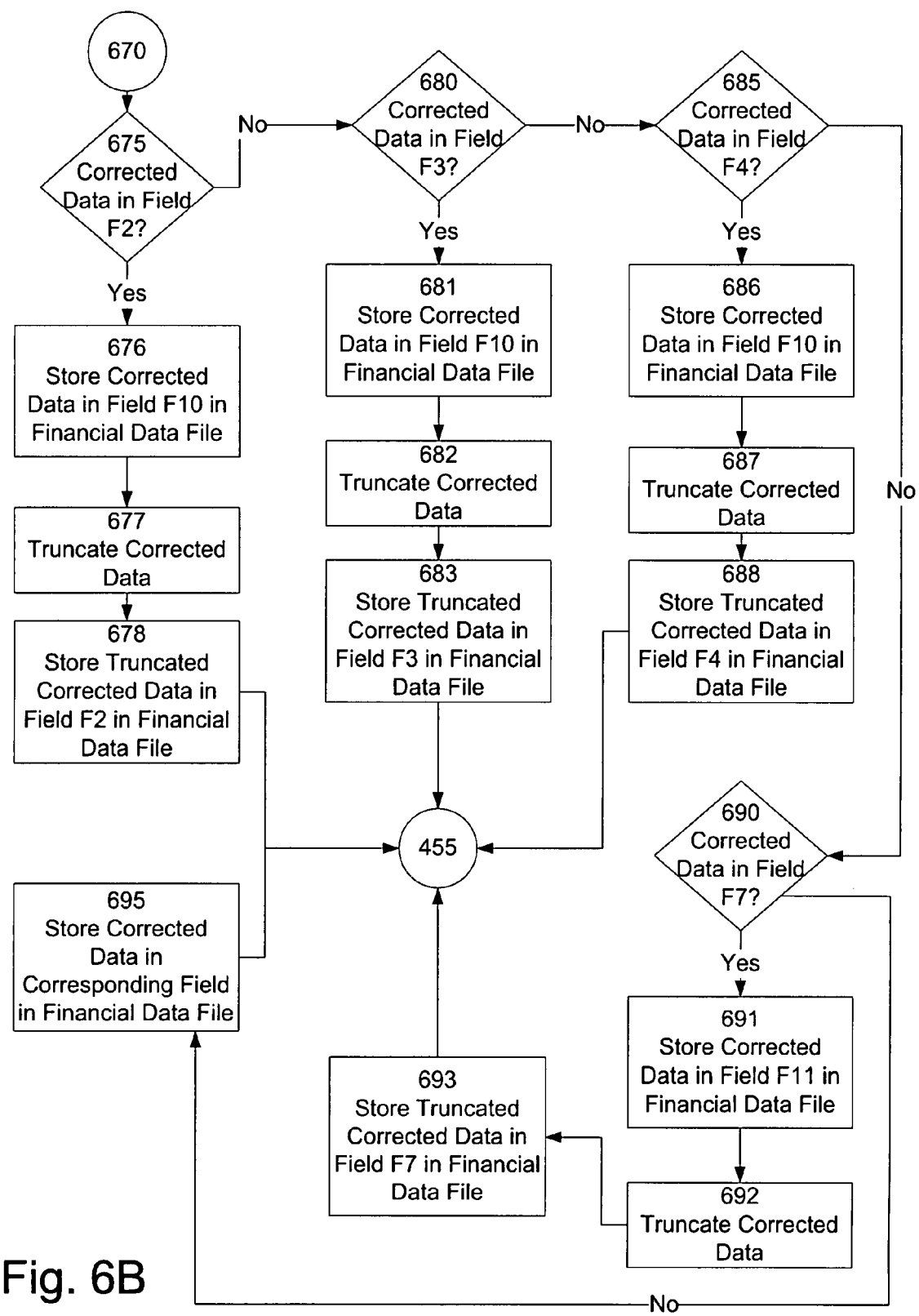

FIG. 6A and FIG. 6B are flow charts depicting a method 450 for conducting a reject/repair analysis of a financial data file using expanded mass data sets of the financial data file, according to an exemplary embodiment of the invention, as referred to in step 450 of FIG. 4. The exemplary method 450 is merely illustrative and, in alternative embodiments of the invention, certain steps can be performed in a different order, performed in parallel with one another, or omitted entirely, and/or certain additional steps can be performed without departing from the scope and spirit of the invention. The method 450 is described below with reference to FIGS. 1 and 6.

In step 605, the reject/repair module 118 analyzes the financial data file for errors. For example, the reject/repair module 118 can detect an error if a field of the financial data file is empty, comprises data in an incorrect format, or comprises the wrong data. In step 607, the reject/repair module 118 determines whether it detected an error. If not, the method 450 branches to step 455 (FIG. 4). If the reject/repair module 118 detects an error, the method 450 branches to step 610.

In step 610, the reject/repair module 118 identifies the image file(s) corresponding to the financial data file. For example, the reject/repair module 118 can identify the image file(s) with the same file name, sequence number, or identification number as the financial data file. In step 615, the reject/repair module 118 presents the image(s) identified in step 610 on the display 119 for viewing by a user. In step 620, the reject/repair module 118 reads the data in fields F1 (amount data), F5 (routing transit number data), and F6 (external process code) of the financial data file. In step 625, the reject/repair module 118 presents the data from fields F1, F5, and F6 of the financial data file on the display 119 for viewing by the user.

In steps 630-665, the reject/repair module 118 presents the untruncated financial data, i.e., the financial data in fields F10 and F11 of the financial data file, in fields F2, F3, F4, and F7 on the display 119.

In step 630, the reject/repair module 118 reads and parses the process control data from field F10 of the financial data file. In step 635, the reject/repair module 118 presents the parsed process control data from field F10 in field F2 on the display 119. Thus, the untruncated process control data from field F10 is displayed in field F2.

In step 640, the reject/repair module 118 reads and parses the account number data from field F10 of the financial data file. In step 645, the reject/repair module 118 presents the parsed account number data from field F10 in field F3 on the display 119. Thus, the untruncated account number data from field F10 is displayed in field F3.

In step 650, the reject/repair module 118 reads and parses the check number data from field F10 of the financial data file. In step 655, the reject/repair module 118 presents the parsed check number data from field F10 in field F4 on the display 119. Thus, the untruncated check number data from field F10 is displayed in field F4.

In step 660, the reject/repair module 118 reads the auxiliary on us data from field F11 of the financial data file. In step 665, the reject/repair module 118 presents the auxiliary on us data from field F11 in field F7 on the display 119. Thus, the untruncated auxiliary on us data from field F11 is displayed in field F7.

By presenting the untruncated financial data in the display 119, the reject/repair module 118 allows a user to evaluate and correct errors in the financial data file using the complete MICR data from the original paper check. The reject/repair module 118 also allows a user to correct errors in both the truncated and untruncated data in the financial data file. In step 670, the user compares the displayed financial data with the displayed electronic check image(s) to determine how to correct the financial data file error. The user can correct the data in the display 119 by inputting the correct data into the reject/repair module via a keyboard 120 or another input device. For example, where a displayed data field is empty but the displayed image of the check comprises data corresponding to the data field, the user can enter the financial data from the displayed image into the displayed data field.

In steps 675-695, the reject/repair module 118 stores the corrected data in the financial data file. In step 675, the reject/repair module 118 determines whether the corrected data is in field F2 in the display 119. If so, the method 450 branches to step 676. In step 676, the reject/repair module 118 stores the corrected process control data in place of the process control data in field F10 of the financial data file. In step 677, the reject/repair module 118 truncates the corrected process control data, as described above in conjunction with FIG. 5, step 517. In step 678, the reject/repair module 118 stores the truncated, corrected process control data in field F2 in the financial data file, and the method 450 continues to step 455 (FIG. 4).

If the reject/repair module 118 determines in step 675 that the corrected data is not in field F2, then the method 450 branches to step 680. In step 680, the reject/repair module 118 determines whether the corrected data is in field F3 in the display 119. If so, the method 450 branches to step 681. In step 681, the reject/repair module 118 stores the corrected account number data in place of the account number data in field F10 of the financial data file. In step 682, the reject/repair module 118 truncates the account number data, as described above in conjunction with FIG. 5, step 522. In step 683, the reject/repair module 118 stores the truncated, corrected account number data in field F3 in the financial data file, and the method 450 continues to step 455 (FIG. 4).

If the reject/repair module 118 determines in step 680 that the corrected data is not in field F3, then the method 450 branches to step 685. In step 685, the reject/repair module 118 determines whether the corrected data is in field F4 in the display 119. If so, the method 450 branches to step 686. In step 686, the reject/repair module 118 stores the corrected check number data in place of the check number data in field F10 of the financial data file. In step 687, the reject/repair module 118 truncates the check number data, as described above in conjunction with FIG. 5, step 527. In step 688, the reject/repair module 118 stores the truncated, corrected check number data in field F4 in the financial data file, and the method 450 continues to step 455 (FIG. 4).

If the reject/repair module 118 determines in step 685 that the corrected data is not in field F4, then the method 450 branches to step 690. In step 690, the reject/repair module 118 determines whether the corrected data is in field F7 in the display 119. If so, the method 450 branches to step 691. In step 691, the reject/repair module 118 stores the corrected auxiliary on us data in place of the auxiliary on us data in field F11 of the financial data file. In step 692, the reject/repair module 118 truncates the auxiliary on us data, as described above in conjunction with FIG. 5, step 545. In step 693, the reject/repair module 118 stores the truncated, corrected auxiliary on us data in field F7 in the financial data file, and the method 450 continues to step 455 (FIG. 4).

If the reject/repair module 118 determines in step 690 that the corrected data is not in field F7, then the method 450 branches to step 695. In step 695, the reject/repair module 118 stores the corrected data in the corresponding field in the financial data file. For example, if the corrected data is in displayed field F1, F5, or F6, the reject/repair module 118 can store the corrected data in field F1, F5, or F6, respectively, of the financial data file. The method 450 continues to step 455 (FIG. 4).

Figure 7:
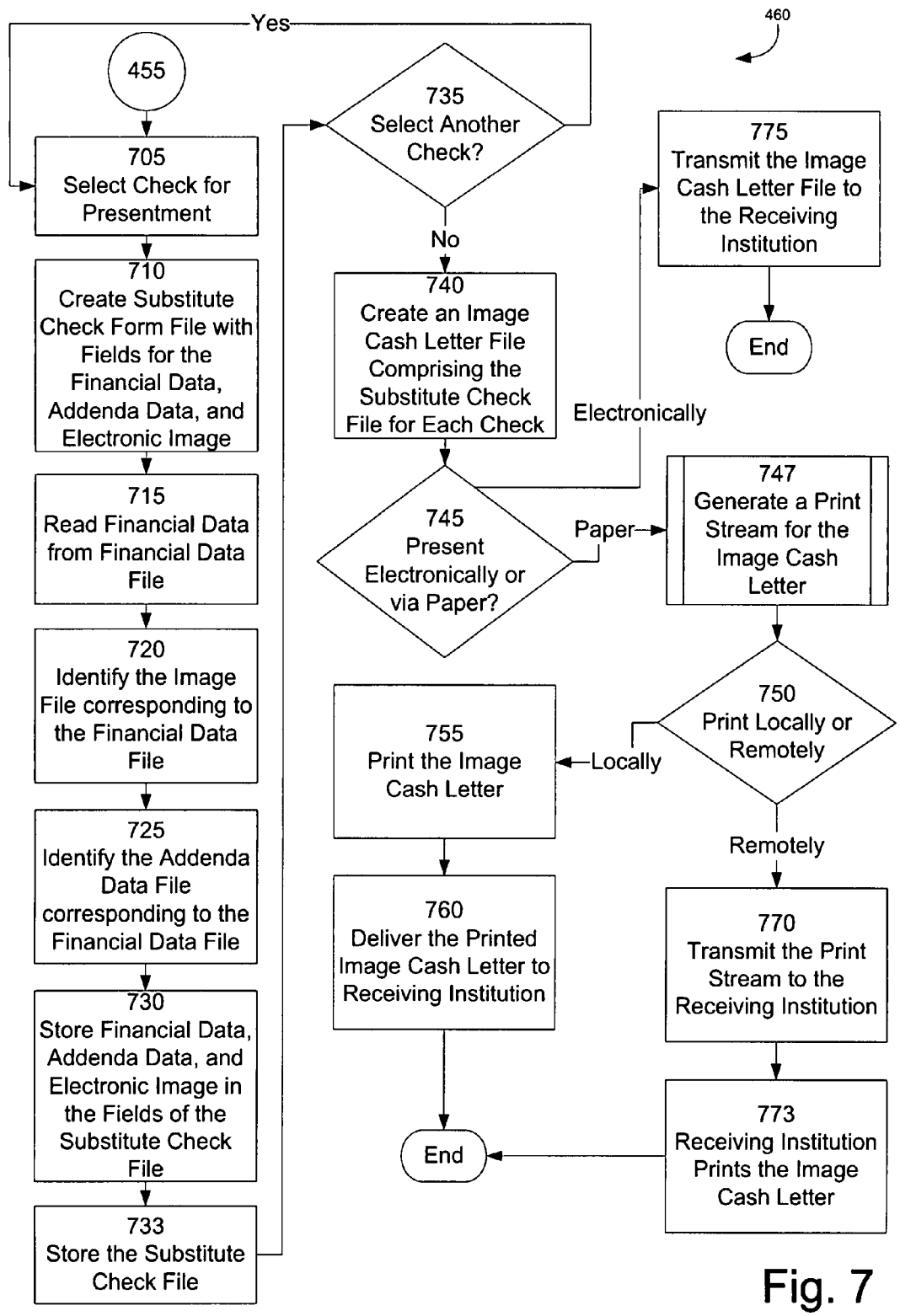
FIG. 7 is a flow chart depicting a method for presenting a check for payment, according to an exemplary embodiment of the invention.

FIG. 7 is a flow chart depicting a method 460 for presenting a check for payment, according to an exemplary embodiment of the invention, as referred to in step 460 of FIG. 4. The exemplary method 460 is merely illustrative and, in alternative embodiments of the invention, certain steps can be performed in a different order, performed in parallel with one another, or omitted entirely, and/or certain additional steps can be performed without departing from the scope and spirit of the invention. The method 460 is described below with reference to FIGS. 1 and 7.

In step 705, the check presentment module 116 selects a check for presentment to the receiving institution 125. In step 710, the check presentment module 116 generates a substitute check form file with fields for the check's financial data, addenda data, and electronic image(s). By entering the financial data, addenda data, and electronic image(s) into the appropriate fields, the check presentment module 116 can create a substitute check file that can be used to present a substitute check and/or an ICL to the receiving institution 125.

In step 715, the check presentment module 116 reads the check's financial data from the financial data file. In step 720, the check presentment module 116 identifies the image file(s) corresponding to the financial data file. For example, the check presentment module 116 can identify the image file(s) with the same file name, sequence number, or identification number as the financial data file. In step 725, the check presentment module 116 identifies the addenda data file(s) corresponding to the financial data file. For example, the check presentment module 116 can identify the addenda data file(s) with the same file name, sequence number, or identification number as the financial data file.

In step 730, the check presentment module 116 stores the financial data from the financial data file, the addenda data from the identified addenda data file(s), and the electronic image(s) from the identified image file(s) in the appropriate fields of the substitute check file. In this regard, the complete, untruncated data from fields F10 and F11 of the financial data file is stored in the substitute check file, thereby including the information necessary for a substitute check to comply with the requirements of the Act. In step 733, the check presentment module 116 stores the substitute check file in the substitute check database 108.

In step 735, the check presentment module 118 determines whether to select another check for presentment to the receiving institution 125. For example, steps 705-733 can be repeated for each check associated with a particular receiving institution 125, whereby the associated checks can be presented to the receiving institution 125 at the same time. If another check is to be selected for presentment, the method 460 branches back to step 705 to repeat steps 705-733 for another check. If not, the method 460 branches to step 740.

In step 740, the check presentment module 116 creates an electronic ICL file comprising the substitute check file for each selected check. The ICL file can further comprise a series of addenda and records related to the selected check(s). For example, the ICL file can comprise an addendum comprising information about a bank of first deposit. In addition, for each bundle of substitute checks in the ICL, the ICL can include a bundle summary control record comprising information about the bundle. For example, the bundle summary control record can comprise a bundle identification number, the number of items (substitute check files) in the bundle, the value of each of the items in the bundle, and the total value of all the items in the bundle. The ICL file also can comprise a cover page control record comprising information about the origin and destination of the ICL file, and a cash letter bundle summary control record comprising a summary of all bundle summary control records in the ICL file.

To create the ICL file in an exemplary embodiment, the check presentment module 116 can organize the substitute check files (or items) into at least one bundle. Each bundle can comprise information regarding one or more substitute checks. The check presentment module 116 can read information regarding the substitute checks from the financial data files, addenda data files, image files, and/or substitute check files corresponding to the substitute checks. Then, the check presentment module 116 can store certain of the read information into appropriate record fields of the ICL file.

The check presentment module 116 also can generate and enter into appropriate fields of the ICL file information regarding the bundle(s). For example, for each bundle, the check presentment module 116 can add up the total number of items in the bundle and the total value of all items in the bundle and can store the total number of items, the total value of all items, and the value of each item in the bundle summary control record corresponding to the bundle. Similarly, the check presentment module 116 can add up the total value of all the items in all of the substitute check bundles (or the total value of all bundles) and can store the total value amount in the cash letter bundle summary control record of the ICL file.

In step 745, the check presentment module 116 determines whether to present the ICL electronically or via paper. If the ICL is to be presented electronically, the method 460 branches to step 775. In step 775, the check presentment module 116 electronically transmits the ICL file to an RI computer 126 of the receiving institution 125, e.g., via a network (not shown).

If the check presentment module 116 determines in step 745 to present the ICL via paper, the method 460 branches to step 747. In step 747, the check presentment module 116 generates a print stream by which the ICL can be printed onto paper. Step 747 is described in more detail below with reference to FIG. 8.

In step 750, the check presentment module 116 determines whether to print the ICL locally or remotely. If the ICL is to be printed locally, the method 460 branches to step 755. In step 755, the check presentment module 116 prints the ICL via a printer 117. The check presentment module 116 prints the ICL using the print stream generated in step 747. More specifically, the check presentment module 116 forwards the print stream to the printer 117 for printing. The printer 117 reads the data specified in print stream, generates the records for printing based on the read data, and prints the generated records in order to create the printed ICL. In step 760, an operator of the check processing site 105 collects the printed ICL, including the paper substitute check(s), for delivery to the receiving institution 125. For example, the operator can mail or courier the printed ICL to the receiving institution 125.

If the check presentment module 116 determines in step 750 to print the ICL remotely, the method 460 branches to step 770. In step 770, the check presentment module 116 transmits the print stream generated in step 747 to the receiving institution 125, e.g., via a network (not shown). In step 773, the receiving institution 125 prints the ICL, including the paper substitute check(s), on the RI printer 127. More specifically, the RI printer 127 reads the data specified in the print stream, generates the records for printing based on the read data, and prints the generated records in order to create the printed ICL.

In an alternative exemplary embodiment of the invention, the check presentment module 116 can generate an ICL print stream (as in step 747 described below with reference to FIG. 8) without first generating an ICL file or a substitute check file. The check presentment module 116 can collect data directly from the image file database 113, the financial data file database 114, and/or the addenda data file database 112 for creation of the print stream. The check presentment module 116 can store the collected data in pre-defined fields of a print stream file and transmit the print stream file to the printer 117 or the RI printer 127 for printing.

Figure 8:
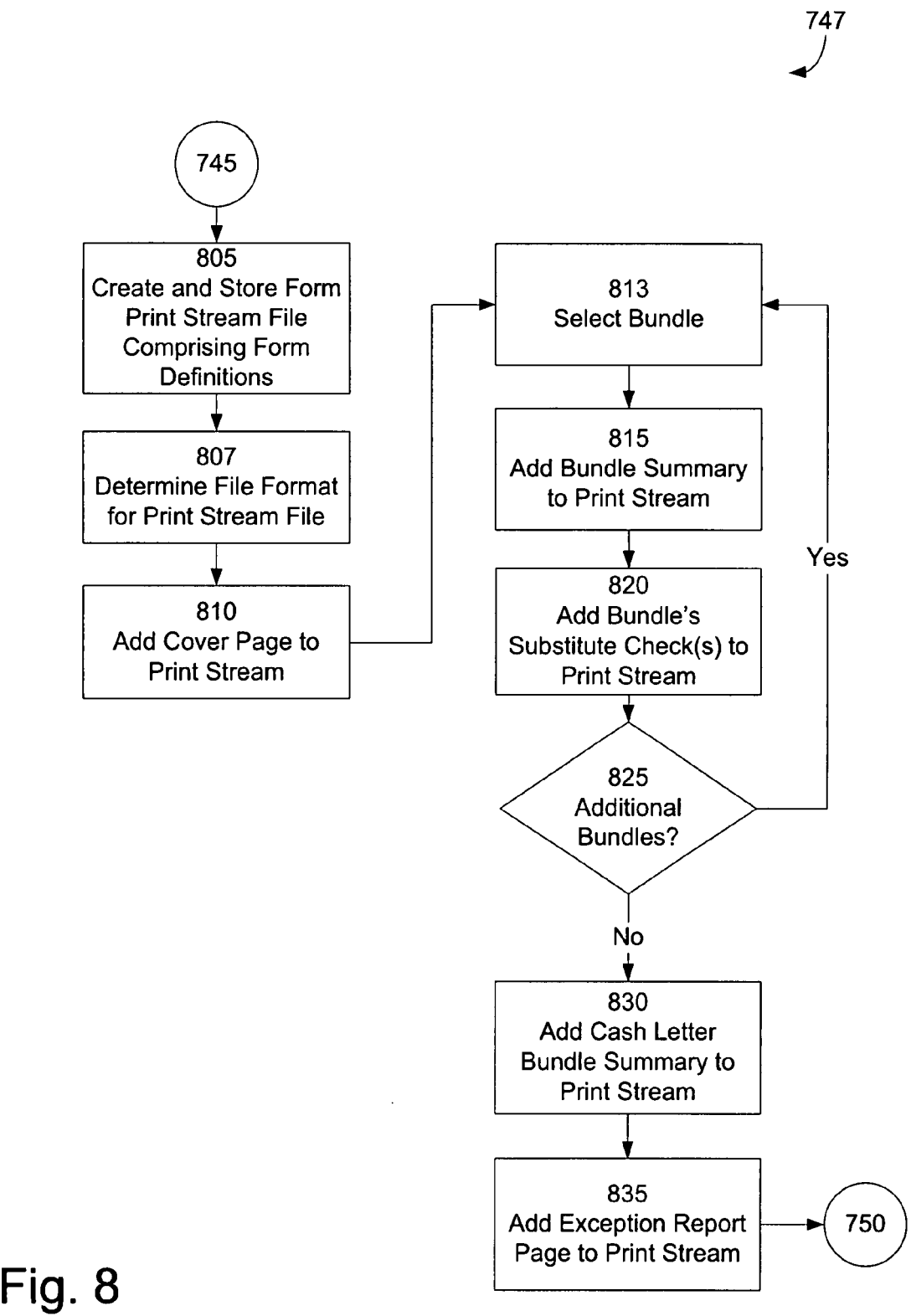
FIG. 8 is a flow chart depicting a method for generating a cash letter print stream, according to an exemplary embodiment of the invention.

FIG. 8 is a flow chart depicting a method 747 for generating a cash letter print stream according to an exemplary embodiment of the invention, as referred to in step 747 of FIG. 7. The exemplary method 747 is merely illustrative and, in alternative embodiments of the invention, certain steps can be performed in a different order, performed in parallel with one another, or omitted entirely, and/or certain additional steps can be performed without departing from the scope and spirit of the invention. The method 747 is described below with reference to FIGS. 1 and 8.

In step 805, a form print stream file is created and stored. The form print stream file comprises electronic form definitions for each cash letter document to be printed in the cash letter. The cash letter documents include a cover page, a bundle summary, substitute checks, a cash letter bundle summary, and an exception report page. The form definitions determine how and where to include information in the print stream for each cash letter document. For example, the form print stream file can comprise a form definition for the print stream for each of the cover page, the bundle summary, the substitute checks, the cash letter bundle summary, and the exception report page. Each form definition defines data fields and their page locations, which each correspond to the information and format required for a paper cash letter. Based on the form definitions, the check presentment module 116 can retrieve and input the proper information (data and/or images) into the data fields to create the print stream. The check presentment module 116 stores the form print stream file in a form database 130.

In step 807, the check presentment module 116 determines the file format in which to generate the print stream. The print stream file format can vary depending on the person or entity printing the cash letter. For example, the file format can vary depending on the printing person/entity's file format capabilities. A cover page control record of the ICL file generated in step 740 (FIG. 7) can comprise information regarding the printing person or entity and/or the person/entity's file format capabilities. For example, if the cover page control record indicates that the cash letter will be printed by a Federal Reserve Bank, the print stream can be in a .AFP file format. Alternative suitable file formats, including the .PDF file format, will be apparent to a person of skill in the art.

In steps 810-830, the check presentment module 116 creates the cash letter print stream in the appropriate file format.

In step 810, the check presentment module 116 adds a cover page to the print stream. The cover page comprises information about the cash letter's contents, such as the number of substitute checks in the cash letter, information identifying the transmitting bank, and/or information identifying the receiving institution 125. For example, the cover page information can comprise information identifying the bank receiving the cash letter by American Bankers Association ("ABA") number, name, and address. It can further comprise print dispatch information, such as the bin, section, and/or courier assigned to the cash letter. To add the cover page to the print stream, the check presentment module 116 inserts information contained within the ICL file into fields of one or more of the form definitions created in step 805. For example, the check presentment module 116 can insert information contained within the ICL's cover page control record into corresponding fields of a cover page form definition.

In step 813, the check presentment module 116 selects a bundle comprising at least one substitute check for inclusion in the print stream. In step 815, the check presentment module 116 adds a bundle summary to the print stream. The bundle summary comprises information regarding the bundle selected in step 813. For example, the bundle summary can comprise the number of substitute checks in the bundle, the value of each of the substitute checks in the bundle, and the total value of all substitute checks in the bundle. To add the bundle summary to the print stream, the check presentment module 116 inserts information contained within the ICL file into fields of one or more of the form definitions created in step 805. For example, the check presentment module 116 can insert information contained within the ICL's bundle summary control record into corresponding fields of a bundle summary form definition.

In step 820, the check presentment module 116 adds the bundle's substitute check(s) to the print stream. To add the substitute check(s) to the print stream, the check presentment module 116 inserts information contained within the ICL file into fields of one or more of the form definitions created in step 805. For example, for each substitute check, the check presentment module 116 can insert the financial data, addenda data, and/or the electronic image(s) corresponding to the substitute check (and/or stored in the substitute check file) into corresponding fields of a substitute check form definition. Upon printing the generated print stream, each substitute check will include all of the original MICR data of the corresponding original paper check and all endorsements. For example, each substitute check can comply with the American National Standards Institute Specifications for an Image Replacement Document (ANSI X9.100-140, X9.90), or other appropriate industry standards, as may change from time to time.

In step 825, the check presentment module 116 determines whether to select another bundle for inclusion in the print stream. For example, steps 813-820 can be repeated for each bundle to be included in the cash letter print stream. If the check presentment module 116 determines to select another bundle, the method 747 branches back to step 813 to repeat steps 813-820 for another bundle. If the check presentment module 116 determines in step 825 not to select another bundle, the method 747 branches to step 830 to complete creation of the print stream.

In step 830, the check presentment module 116 adds a cash letter bundle summary to the print stream. The cash letter bundle summary comprises information about all of the bundles in the cash letter. For example, the cash letter bundle summary can comprise a total of the value of all the bundles in the cash letter. To add the cash letter bundle summary to the print stream, the check presentment module 116 inserts information contained within the ICL file into fields of one or more of the form definitions created in step 805. For example, the check presentment module 116 can insert information from the cash letter bundle summary control record into corresponding fields of a cash letter bundle summary form definition.

In step 835, the check presentment module 116 adds an exception report page to the print stream. The exception report page comprises information regarding any errors the check presentment module 116 incurred when adding other documents to the print stream file. For example, the exception report information can identify a substitute check for which the check presentment module 116 was unable to input corresponding substitute check information into the substitute check form definition. To add the exception report page to the print stream, the check presentment module 116 inserts information contained within the ICL file into fields of one or more of the form definitions created in step 805. For example, the check presentment module 116 can insert information regarding or identifying the errors into corresponding fields of an exception report page form definition.

The method 747 continues to step 750 (FIG. 7).

As set forth above, in alternative exemplary embodiments of the invention, the depositing institution 103 can generate an ICL for received checks or forward received paper checks to the capture site 104. In such embodiments, the depositing institution 103 or the capture site 104 can perform certain of the method steps described above with reference to FIGS. 4-7. For example, if the depositing institution 103 generates an ICL for received checks, the depositing institution 103 can capture, generate, and store electronic check images and financial data, as set forth in exemplary steps 405-445 of FIGS. 4, 5A, and 5B. In addition, the reject/repair module 213 of the depositing institution 103 can perform reject/repair functions on the captured financial data, as set forth in the exemplary method 450 of FIGS. 4, 6A, and 6B. The ICL Module 215 of the depositing institution 103 can generate an ICL comprising the captured electronic check images and financial data and can forward the generated ICL to the check processing site 105, which can process the ICL in accordance with certain of the remaining exemplary steps of FIGS. 4, 7, and 8.

Figure 9:
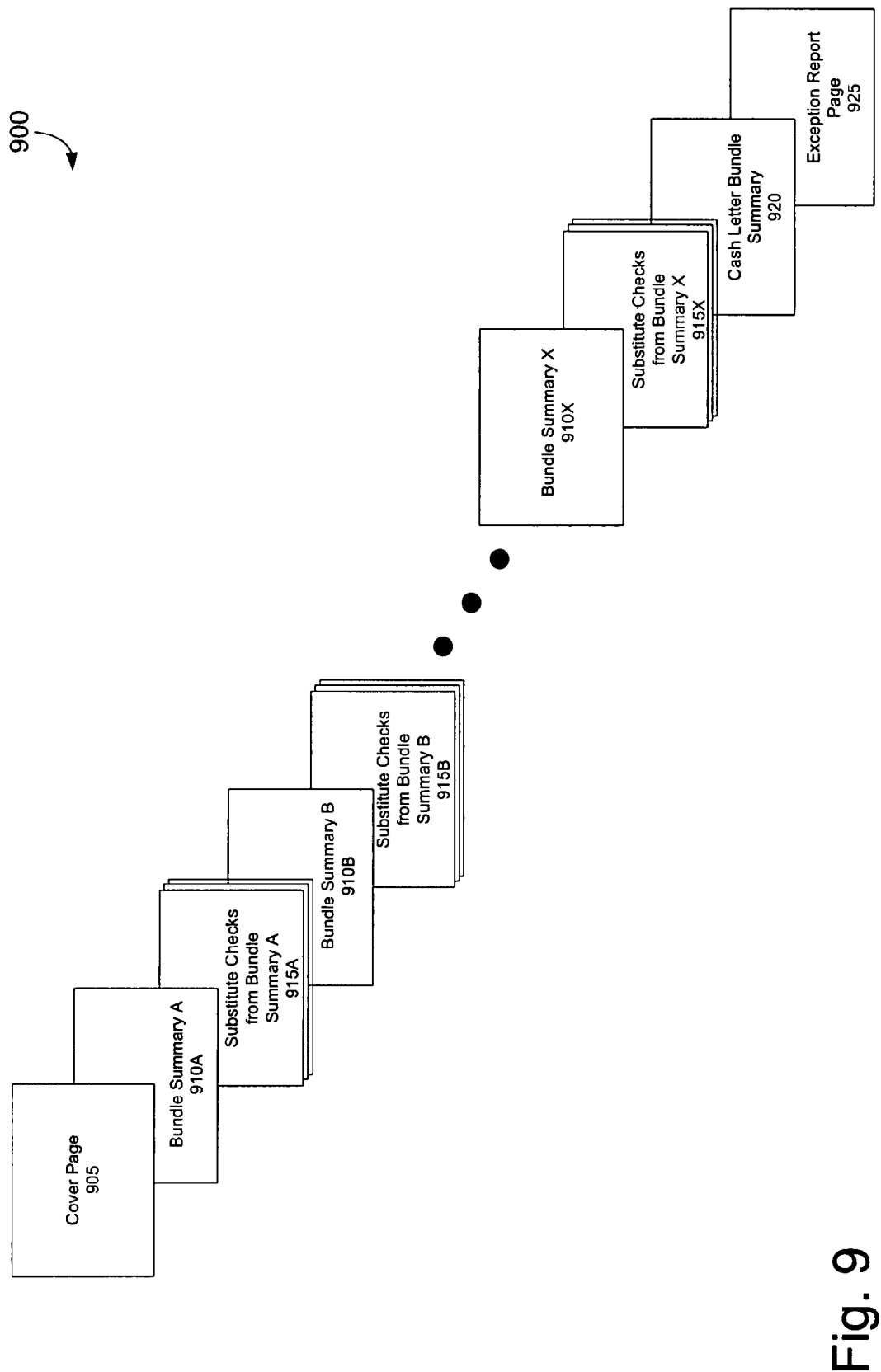
FIG. 9 is a block diagram depicting a print stream generated in accordance with an exemplary embodiment of the invention.

FIG. 9 is a block diagram depicting a print stream 900 generated in accordance with an exemplary embodiment of the invention. First in the print stream 900 is the cover page 905. The cover page 905 comprises information regarding the cash letter's contents, such as the number of substitute checks in the cash letter, information identifying the transmitting bank, and/or information identifying the receiving institution 125. For example, the cover page can comprise information identifying the bank receiving the cash letter by ABA number, name, and address. It can further comprise print dispatch information, such as the bin, section, and/or courier assigned to the cash letter.

Second in the print stream is the bundle summary 910A for the first bundle in the cash letter. The bundle summary 910A comprises information regarding the contents of the first bundle. For example, the bundle summary 910A can comprise the number of substitute checks in the bundle, the value of each of the substitute checks in the bundle, and the total value of all substitute checks in the bundle. For each bundle of substitute checks in the print stream, there is a corresponding bundle summary 910A, 910B, 910X.

After each respective bundle summary 910A, 910B, 910X in the print stream are the substitute checks 915A, 915B, 915X listed in the corresponding bundle summary 910A, 910B, 910X. Each substitute check can comprise all of the original MICR data of the corresponding original paper check and all endorsements.

Next in the print stream 900 is the cash letter bundle summary 920. The cash letter bundle summary 920 comprises information about all of the bundles in the cash letter. For example, the cash letter bundle summary 920 can comprise a total of the value of all the bundles in the cash letter.

Last in the print stream 900 is the exception report page 925, which comprises information regarding any errors the check presentment module 116 incurred when generating other documents in the print stream file. For example, the exception report page 925 can comprise information identifying a substitute check for which the check presentment module 116 was unable to input corresponding substitute check information into the substitute check form definition.

The information from the print stream 900 can be printed in order, with the resulting printout comprising a paper cash letter. For example, printing the information from the print stream 900 depicted in FIG. 9, results in a properly formatted and ordered paper cash letter comprising substitute checks and audit data. The audit data (i.e., the cover page 905, the bundle summary 910A, 910B, 910X, the cash letter bundle summary 920, and the exception report page 925) comprises control reports that detail the documents printed concurrently therewith. Thus, the audit data provides a real-time inventory of the paper cash letter.

In an exemplary embodiment, the print stream 900 can be printed on perforated paper and passed through a bursting machine to create the paper cash letter. Upon printing, a paper burster can separate each printed page at its perforations, so that each separated page comprises a portion of the cash letter. Thus, the cover page 905, bundle summaries 910A, 910B, 910X, substitute checks 915A, 915B, 915X, cash letter bundle summary 920, and exception report page 925 can each be printed on a separate page based on the size of the pages between the perforations. Additionally, the different components of the paper cash letter can be printed on different color paper for easy identification.

In one embodiment of the invention, the check presentment module 116 can instruct the printer 117 (or the RI printer 127) to print each of the documents on different types, colors, and/or sizes of paper. For example, the check presentment module 116 can instruct the printer 117 (or the RI printer 127) to print the substitute checks 915A, 915B, 915X on yellow paper and each of the other documents in the cash letter on blue paper. In yet another embodiment of the invention, the type, color, and/or size of the paper can vary depending on whether the transaction is a forward transaction or a return transaction. For example, the check presentment module 116 can instruct the printer 117 (or the RI printer 127) to print each of the non-substitute check documents of a forward transaction on blue paper and each of the non-substitute check documents of a return transaction on red paper. In an exemplary embodiment, the print stream file form definition corresponding to each cash letter document can comprise a designation for a particular type, color, and/or size of paper on which to print the corresponding cash letter document.

FIG. 10 is a block diagram depicting a cover page 1000 printed from a print stream generated in accordance with an exemplary embodiment of the invention. The cover page 1000 is printed on one section of a perforated sheet of paper and comprises information regarding the cash letter's contents. The cover page 1000 can be separated from the other sections of the perforated sheet by tearing the sheet at its perforations. The exemplary cover page 1000 comprises a count 1005 of the number of items in the cash letter and destination information 1010 identifying the destination of the cash letter by ABA number, name, and address. It further comprises print dispatch information, such as the bin, section, and/or courier assigned to the cash letter. A person of skill in the art will recognize that the cover page 1000 can comprise other additional information related to the cash letter's contents, and/or certain illustrated information can be removed from the cover page 1000, without departing from the scope and spirit of the invention.

FIG. 11 is a block diagram depicting a bundle summary page 1100 printed from a print stream generated in accordance with an exemplary embodiment of the invention. The bundle summary page 1100 is printed on three sections of a perforated sheet of paper. The sections of the bundle summary page 1100 can be separated from one another by tearing the sheet at its perforations. The exemplary bundle summary page 1100 comprises a count 1105 of the number of items in bundle A, the value of each of the items in the bundle, and the total value 1110 of all items in the bundle. It also includes information identifying the destination of the bundle summary page 1100 by bank name and address. A person of skill in the art will recognize that the bundle summary page 1100 can comprise other additional information related to the items in bundle A, and/or certain illustrated information can be removed from the bundle summary page 1100, without departing from the scope and spirit of the invention.

Figure 12:
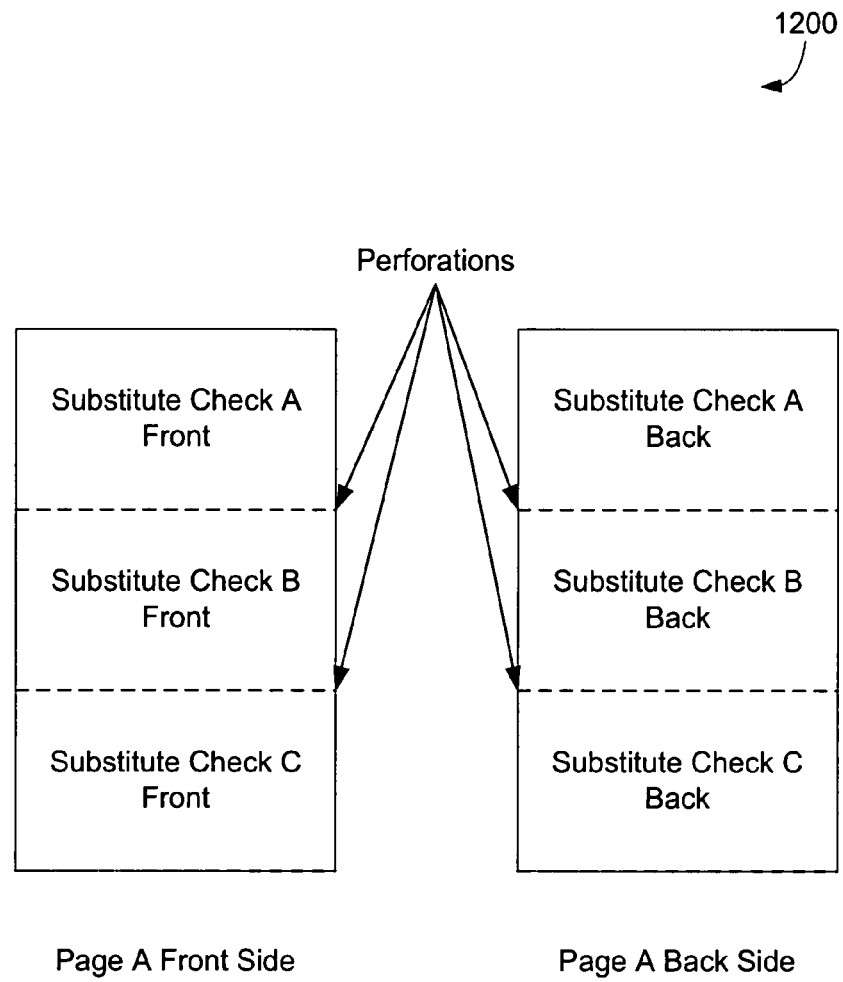
FIG. 12 is a block diagram depicting a substitute check page printed from a print stream generated in accordance with an exemplary embodiment of the invention.

FIG. 12 is a block diagram depicting a substitute check page 1200 printed from a print stream generated in accordance with an exemplary embodiment of the invention. The substitute check page 1200 comprises multiple substitute checks, printed front and back, on perforated paper. As shown in FIG. 12, three substitute checks can be printed on a single piece of perforated paper, which can be separated at its perforations to produce individual pages for each substitute check.

FIG. 13 is a block diagram depicting a cash letter bundle summary page 1300 printed from a print stream generated in accordance with an exemplary embodiment of the invention. The cash letter bundle summary page 1300 is printed on three sections of a perforated sheet of paper. The sections of the cash letter bundle summary page 1300 can be separated from one another by tearing the sheet at its perforations. The exemplary cash letter bundle summary page 1300 comprises information regarding each bundle in the cash letter, including a bundle ID, bundle number, item count, and total value amount for each bundle in the cash letter. The cash letter bundle summary page 1300 comprises a total item count 1305 and a total value amount for all the bundles 1310. In addition, the cash letter bundle summary page 1300 comprises information identifying the destination of the cash letter bundle summary page 1300 by bank ABA number, name, and address. A person of skill in the art will recognize that the cash letter bundle summary page 1300 can comprise other additional information related to the cash letter bundles, and/or certain illustrated information can be removed from the cash letter bundle summary page 1300, without departing from the scope and spirit of the invention.

FIG. 14 is a block diagram depicting an exception report page 1400 printed from a print stream generated in accordance with an exemplary embodiment of the invention. The exception report page 1400 is printed on one section of a perforated sheet of paper. The exception report page 1400 can be separated from the other sections of the perforated sheet by tearing the sheet at its perforations. The exemplary exception report page 1400 comprises information regarding errors the check presentment module incurred when generating other documents in the print stream file. The errors relate to three documents, which are identified by routing transit number, sequence number, amount, and bundle ID. In addition, a reason for each error is provided. A person of skill in the art will recognize that the exception report page 1400 can comprise other additional information related to the errors, and/or certain illustrated information can be removed from the exception report page 1400, without departing from the scope and spirit of the invention.

Figure 15:
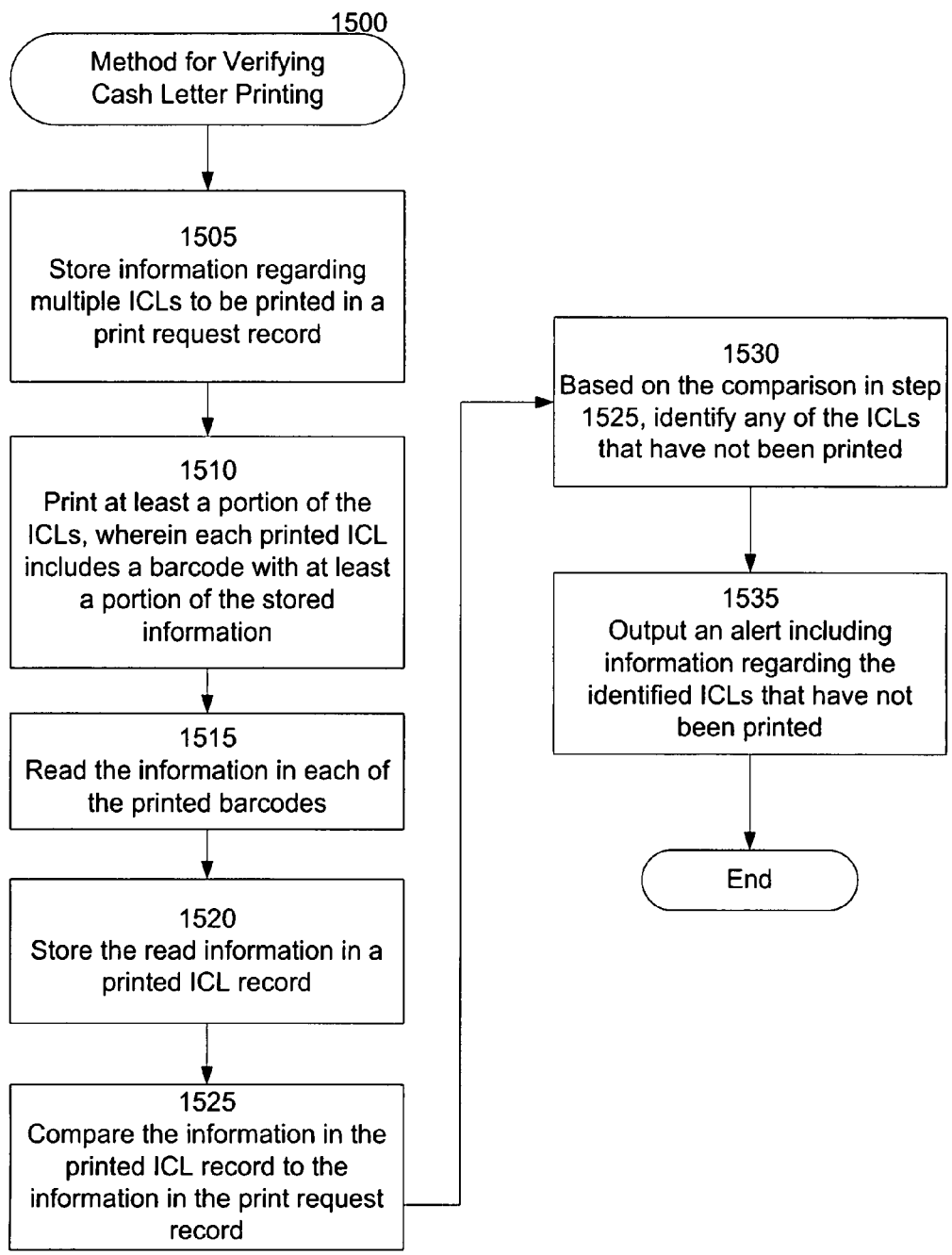
FIG. 15 is a flow chart depicting a method for verifying cash letter printing, according to an exemplary embodiment of the invention.

FIG. 15 is a flow chart depicting a method 1500 for verifying cash letter printing, according to an exemplary embodiment of the invention. The exemplary method 1500 is merely illustrative and, in alternative embodiments of the invention, certain steps can be performed in a different order, performed in parallel with one another, or omitted entirely, and/or certain additional steps can be performed without departing from the scope and spirit of the invention. The method 1500 is described below with reference to FIGS. 1 and 15.

In step 1505, the check presentment module 116 stores information regarding multiple ICLs to be printed in a print request record. The term "record" is used herein to refer to a set of electronic data, including, without limitation, a table, a file, and a part of a table or file. The information stored in the print request record includes data that uniquely identifies each ICL to be printed. For example, for each ICL, the print request record can include a total value of the items in the ICL, an ABA number of the bank that will receive the printed ICL, a total number of bundles in the ICL, and/or a total number of items in the ICL. In certain exemplary embodiments, the check presentment module 116 can store the print request record in a print database 135 of the check processor 109.

In step 1510, at least a portion of the ICLs are printed. Each printed ICL includes a machine-readable identifier, such as a barcode, with at least a portion of the information stored in the print request record. For example, one of the printers 117 and 127 can print the ICLs upon receiving an ICL print stream from the check presentment module 116, substantially as described above in connection with FIGS. 7 and 8. The print stream can include information necessary for printing the machine-readable identifier, including at least a portion of the information stored in the print request record. In certain exemplary embodiments, a cover page of each printed ICL can include the printed machine-readable identifier.

In step 1515, the check presentment module 116 reads the information in each of the printed machine-readable identifiers of the printed ICLs. In certain exemplary embodiments, the check presentment module 116 can receive the information from one or more barcode scanners (not shown) or other data readers at the print location (i.e., the check processing site 105 or the receiving institution 125). For example, an operator at the print location can scan a printed barcode after the ICL containing the barcode is done printing.

In step 1520, the check presentment module 116 stores the information read in step 1515 in a printed ICL record. In certain exemplary embodiments, the check presentment module 116 can store the printed ICL record in the print database 135. In step 1525, the check presentment module 116 compares the information in the print request record and the printed ICL record. Based on that comparison, in step 1530, the check presentment module 116 identifies the ICLs, if any, that have not been printed (in step 1510).

For example, if information identifying a particular ICL is present in the print request record but not in the printed ICL record, the check presentment module 116 can identify the ICL as not having been printed. Similarly, if information identifying a particular ICL is present in both the print request record and the printed ICL record, the check presentment module 116 can not identify the ICL.

In step 1535, the check presentment module 116 outputs an alert including information regarding the ICLs identified in step 1530. For example, the check presentment module 116 can output a visual and/or audible alert via one or more output devices at the check processing site 105 and/or the receiving institution 125. In certain exemplary embodiments, an operator receiving the alert can investigate why the identified ICLs failed to print. For example, the operator can identify a printing error that caused the printing failure. The operator also can instruct the check presentment module 116 to attempt to re-print the ICL.

In certain exemplary embodiments, an operator can instruct the check presentment module 116 to perform one or more of the comparison, identification, and alert functions of steps 1525-1535 via the keyboard 120 or another input device associated with the check processor 109 and/or the receiving institution 125. Alternatively, the check presentment module 116 can be configured to automatically perform these functions. For example, the check presentment module 116 can be configured to automatically perform these functions at specified time intervals.

Although the method 1500 has been described herein with regard to ICLs, a person of ordinary skill in the art having the benefit of the present disclosure will recognize that the method 1500 also can be applied to verify printing of items and/or item bundles. For example, the ICL printed in step 1510 can include a machine-readable identifier for each item and/or bundle. The machine-readable identifier can include information uniquely identifying the item and/or bundle. The check presentment module 116 can compare information in each printed machine-readable identifier with information in the print request record to determine whether each item and/or bundle has been printed.

Figure 16:
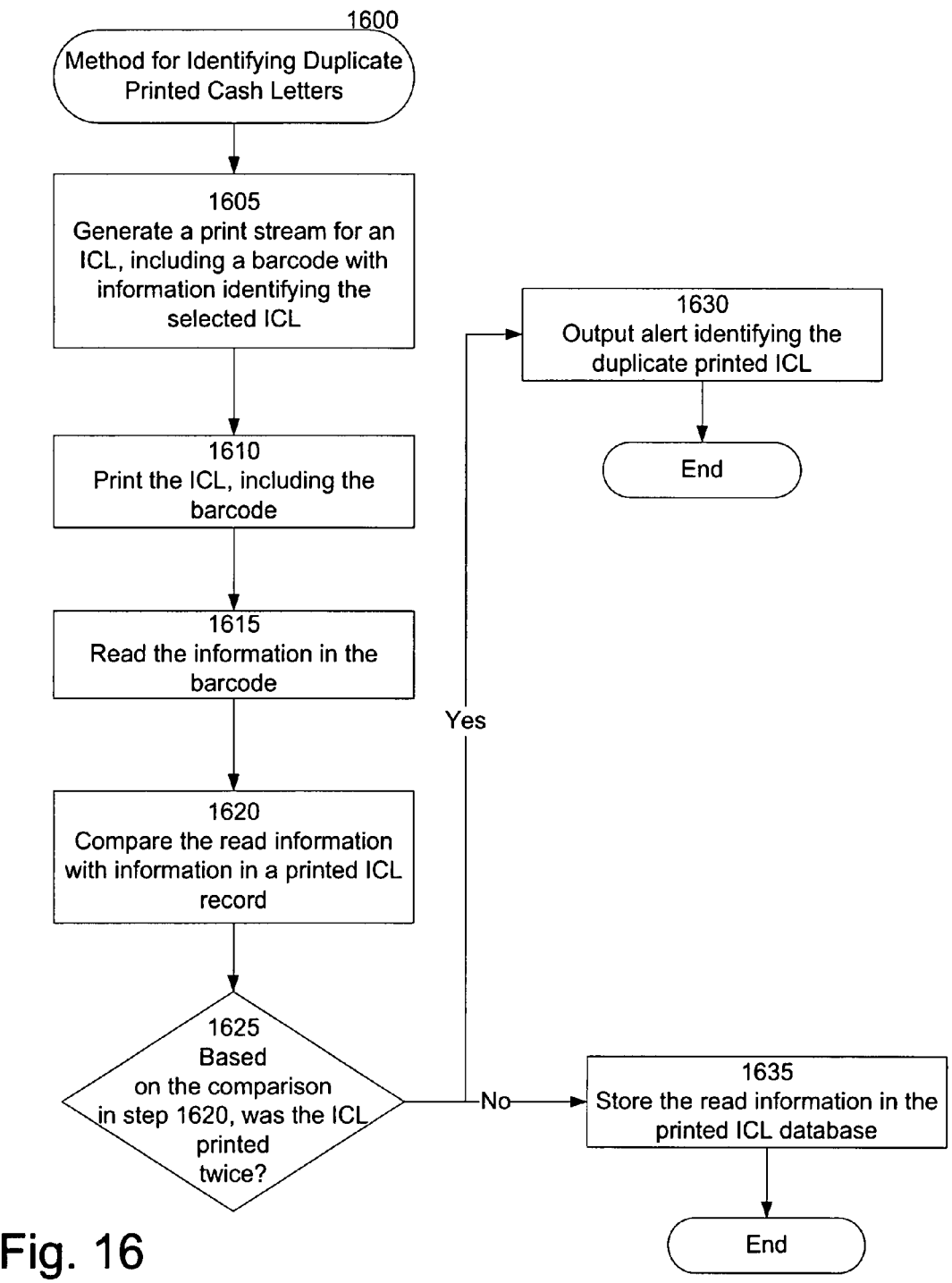
FIG. 16 is a flow chart depicting a method for identifying duplicate printed paper cash letters, according to an exemplary embodiment of the invention.

FIG. 16 is a flow chart depicting a method 1600 for identifying duplicate printed paper cash letters, according to an exemplary embodiment of the invention. The exemplary method 1600 is merely illustrative and, in alternative embodiments of the invention, certain steps can be performed in a different order, performed in parallel with one another, or omitted entirely, and/or certain additional steps can be performed without departing from the scope and spirit of the invention. The method 1600 is described below with reference to FIGS. 1 and 16.

In step 1605, the check presentment module 116 generates a print stream for an ICL. The print stream includes information necessary for printing a machine-readable identifier, such as a barcode, with information uniquely identifying the ICL, such as a total value of the items in the ICL, an ABA number of the bank that will receive the printed ICL, a total number of bundles in the ICL, and/or a total number of items in the ICL. For example, the check presentment module 116 can generate the ICL print stream substantially as described above in connection with FIGS. 7 and 8. In certain exemplary embodiments, the print stream can include an ICL cover page including the machine-readable identifier.

In step 1610, the check presentment module 116 prints the ICL, including the machine-readable identifier. For example, the check presentment module 116 can transmit the print stream to one of the printers 117 and 127 for printing. In step 1615, the check presentment module 116 reads the information in the printed machine-readable identifier of the printed ICL. In certain exemplary embodiments, the check presentment module 116 can receive the information from a barcode scanner (not shown) or other data reader at the print location (i.e., the check processing site 105 or the receiving institution 125). For example, an operator at the print location can scan a printed barcode after the ICL containing the barcode is done printing.

In step 1620, the check presentment module 116 compares the read information with information in a printed ICL record. As described above in connection with FIG. 15, the printed ICL record includes information uniquely identifying ICLs that already have been printed. This information in the printed ICL record originated from data read from the machine-readable identifiers associated with each printed ICL upon completion of printing of the ICL. For example, for each printed ICL, the information can include a total value of the items in the ICL, an ABA number of the bank that will receive the printed ICL, a total number of bundles in the ICL, and/or a total number of items in the ICL.

Based on the comparison in step 1620, in step 1625, the check presentment module 116 determines whether the ICL was printed twice, i.e., whether the printed cash letter is a duplicate of an already printed ICL. For example, if the printed ICL record includes information identifying the ICL, then the check presentment module 116 can determine that the ICL was printed twice. Similarly, if the printed ICL record does not include information identifying the ICL, then the check presentment module 116 can determine that the ICL was not printed twice.

If the check presentment module 116 determines in step 1625 that the ICL was printed twice, the method 1600 branches to step 1630. In step 1630, the check presentment module 116 outputs an alert identifying the duplicate printed ICL. For example, the check presentment module 116 can output a visual and/or audible alert via one or more output devices at the check processing site 105 and/or the receiving institution 125. In certain exemplary embodiments, an operator receiving the alert can discard the printed ICL.

If the check presentment module 116 determines in step 1625 that the ICL was not printed twice, then the method 1600 branches to step 1635. In step 1635, the check presentment module 116 stores the information read in step 1615 in the printed ICL record, so that the check presentment module 116 can identify any subsequently printed duplicates of the printed ICL by comparing information in the duplicates with the information stored in the printed ICL record.

Although the method 1600 has been described herein with regard to ICLs, a person of ordinary skill in the art having the benefit of the present disclosure will recognize that the method 1600 also can be applied to identify duplicate printed items and/or duplicate printed item bundles. For example, the print stream generated in step 1605 can include a machine-readable identifier for each item and/or bundle. The machine-readable identifier can include information uniquely identifying the item and/or bundle. The check presentment module 116 can compare information in a printed machine-readable identifier with information in the printed ICL record to determine whether each item and/or bundle is a duplicate.

The invention can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

We claim:

1. A computer-implemented method for identifying duplicate printed cash letters, comprising the steps of:
   receiving by a check presentment module information obtained from a printed machine-readable identifier comprising information identifying a printed cash letter associated with the printed machine-readable identifier, the printed cash letter comprising at least one substitute check that is a legal equivalent of a corresponding paper check, the check presentment module implemented in a computer system that comprises instructions stored in a machine-readable medium and a processor that executes the instructions;
   determining by the check presentment module whether the cash letter was printed twice by determining whether information stored in a record corresponds to the received information, wherein the information stored in the record identifies cash letters that were printed previously; and
   outputting by the check presentment module an alert advising that the cash letter was printed twice in response to determining that the cash letter was printed twice.

2. The method of claim 1, wherein the printed machine-readable identifier comprises a barcode.

3. The method of claim 1, wherein the information in the printed machine-readable identifier comprises information uniquely identifying the cash letter.

4. The method of claim 3, wherein the information uniquely identifying the cash letter comprises at least one of a total value of items in the cash letter, an ABA number of a bank that will receive a printed copy of the cash letter, a total number of item bundles in the cash letter, and a total number of items in the cash letter.

5. The method of claim 1, wherein the step of determining whether the cash letter was printed twice comprises the step of determining whether the record comprises information uniquely identifying the cash letter.

6. The method of claim 1, further comprising the step of the check presentment module storing the received information in the record in response to determining that the cash letter was not printed twice.

7. The method of claim 1, wherein the alert uniquely identifies the cash letter.

8. The method of claim 1, further comprising the steps of:
   generating via the check presentment module a print stream for the cash letter, the print stream comprising information to be included in the printed machine-readable identifier; and
   printing the cash letter and the machine-readable identifier based on the generated print stream.

9. A computer program product, comprising:
   a computer-readable medium having computer-executable program code embodied therein for preventing duplicative electronic check processing, the computer-readable medium comprising:
   computer-readable program code for receiving information obtained from a printed machine-readable identifier comprising information identifying a printed cash letter associated with the printed machine-readable identifier, the printed cash letter comprising at least one substitute check that is a legal equivalent of a corresponding paper check;
   computer-readable program code for determining whether the cash letter was printed twice by determining whether information stored in a record comprises the received information, wherein the information stored in the record identifies cash letters that were printed previously; and
   computer-readable program code for outputting an alert advising that the cash letter was printed twice in response to determining that the cash letter was printed twice.

10. A system for identifying duplicate printed cash letters, comprising:
    means for reading information in a printed machine-readable identifier, the printed machine-readable identifier comprising information identifying a printed cash letter associated with the printed machine-readable identifier, the printed cash letter comprising at least one substitute check that is a legal equivalent of a corresponding paper check;
    means for storing information in a record, wherein the information stored in the record identifies cash letters that were printed previously; and
    means for determining whether the cash letter was printed twice by determining whether the information stored in the record comprises the read information,
    wherein the means for storing stores the read information in the record in response to a determination that the cash letter was not printed twice.

11. The system of claim 10, wherein the printed machine-readable identifier comprises a barcode.

12. The system of claim 10, wherein the information in the printed machine-readable identifier comprises information uniquely identifying the cash letter.

13. The system of claim 12, wherein the information uniquely identifying the cash letter comprises at least one of a total value of items in the cash letter, an ABA number of a bank that will receive a printed copy of the cash letter, a total number of item bundles in the cash letter, and a total number of items in the cash letter.

14. The system of claim 10, wherein the step of determining whether the cash letter was printed twice comprises the step of determining whether the record comprises information uniquely identifying the cash letter.

15. The system of claim 10, further comprising the step of outputting an alert advising that the cash letter was printed twice in response to determining that the cash letter was printed twice.

16. The system of claim 15, wherein the alert uniquely identifies the cash letter.

17. The system of claim 10, further comprising:
means for generating a print stream for the cash letter, the print stream comprising information to be included in the printed machine-readable identifier; and
means for printing the cash letter and the machine-readable identifier based on the generated print stream.

18. A system for identifying duplicate printed cash letters, comprising:
a check presentment module that generates a print stream for printing a cash letter, the print stream comprising information to be included in a printed machine-readable identifier comprising information identifying the cash letter, the printed cash letter comprising at least one substitute check that is a legal equivalent of a corresponding paper check;
a reading device that reads the information in the printed machine-readable identifier; and
a database that stores information in a record, wherein the information stored in the record identifies cash letters that were printed previously,
wherein the check presentment module determines whether the cash letter was printed twice by comparing the read information with the information stored in the record to determine whether the information stored in the record corresponds to the read information, stores the read information in the record in the database in response to determining that the cash letter was not printed twice, and outputs an alert advising that the cash letter was printed twice in response to determining that the cash letter was printed twice.

19. The system of claim 18, wherein the printed machine-readable identifier comprises a barcode.

20. The system of claim 18, wherein the information in the printed machine-readable identifier comprises information uniquely identifying the cash letter, the information uniquely identifying the cash letter comprising at least one of a total value of items in the cash letter, an ABA number of a bank that will receive a printed copy of the cash letter, a total number of item bundles in the cash letter, and a total number of items in the cash letter.

21. The system of claim 18, wherein the step of determining whether the cash letter was printed twice comprises the step of determining whether the record comprises information uniquely identifying the cash letter.

22. The system of claim 18, wherein the alert uniquely identifies the cash letter.

23. A computer program product, comprising:
a computer-readable medium having computer-executable program code embodied therein for preventing duplicative electronic check processing, the computer-readable medium comprising:
computer-readable program code for generating a print stream for a cash letter, the print stream comprising information to be included in a printed machine-readable identifier comprising information identifying the cash letter;
computer-readable program code for printing the cash letter and the machine-readable identifier, the printed cash letter comprising at least one substitute check that is a legal equivalent of a corresponding paper check;
computer-readable program code for receiving the information from the printed machine-readable identifier;
computer-readable program code for determining whether the cash letter was printed twice by determining whether information stored in a record corresponds to the received information;
computer-readable program code for storing the received information in the record in response to determining that the cash letter was not printed twice; and
computer-readable program code for outputting an alert advising that the cash letter was printed twice in response to determining that the cash letter was printed twice.

24. The method of claim 1, wherein the check presentment module performs the receiving step by reading the information from the printed machine-readable identifier.

25. The method of claim 1, further comprising the step of, prior to the receiving step, printing the cash letter and the associated machine-readable identifier.

26. The method of claim 1, wherein the check presentment module determines that the cash letter was printed twice in response to determining that the information stored in the record comprises the received information.

27. The system of claim 10, further comprising means for printing the cash letter and the associated machine-readable identifier.

28. The system of claim 18, further comprising a printer that receives the print stream and that prints the cash letter and the associated machine-readable identifier.

29. An apparatus for identifying duplicate printed cash letters, comprising a check presentment system that generates a print stream comprising information to be included in a printed machine-readable identifier identifying a cash letter and thereafter determines whether the cash letter was printed twice by comparing the printed machine-readable identifier with stored information identifying cash letters that were printed previously, the check presentment system outputting an alert advising that the cash letter was printed twice in response to determining that the stored information corresponds to the information in the printed machine-readable identifier, the printed cash letter comprising at least one substitute check that is a legal equivalent of a corresponding paper check.

30. The apparatus of claim 29, further comprising a database that maintains the stored information in a record.

31. The apparatus of claim 29, further comprising a reading device that reads the information in the printed machine-readable identifier.

32. The apparatus of claim 29, wherein the information in the printed machine-readable identifier comprises information uniquely identifying the cash letter, the information uniquely identifying the cash letter comprising at least one of a total value of items in the cash letter, an ABA number of a bank that will receive a printed copy of the cash letter, a total number of item bundles in the cash letter, and a total number of items in the cash letter.

33. A computer-implemented method for identifying duplicate printed cash letters, comprising the steps of:

generating, via a check presentment module, an electronic print stream for a cash letter, the print stream comprising a plurality of substitute check records for the cash letter, at least one bundle summary control record for the cash letter, and at least one cover page control record for the cash letter, the electronic print stream further comprising information for a machine-readable identifier, the information identifying the cash letter, wherein printing of the print stream produces a printed version of the cash letter and a printed version of the machine-readable identifier;

communicating the print stream to a location that is remote from the check presentment module;

receiving by the check presentment module the information obtained from the printed version of the machine-readable identifier, thereby indicating that the electronic print stream has been printed to create the printed version of the cash letter;

determining by the check presentment module whether the paper version of the cash letter has been printed twice by determining whether information stored in a record corresponds to the received information, wherein the information stored in the record identifies cash letters that were printed previously; and communicating, by the check presentment module, an alert to the remote location advising that the cash letter has been printed twice in response to determining that the cash letter was printed twice, wherein the check presentment module is implemented in a computer system that comprises instructions stored in a machine-readable medium and a processor that executes the instructions.

34. The method of claim 33, wherein the printed machine-readable identifier comprises a barcode.

35. The method of claim 33, wherein the information identifying the cash letter comprises at least one of a total value of items in the cash letter, an ABA number of a bank that will receive a printed copy of the cash letter, a total number of item bundles in the cash letter, and a total number of items in the cash letter.

36. The method of claim 33, wherein the step of determining whether the cash letter was printed twice comprises the step of determining whether the record comprises the information identifying the cash letter.

37. The method of claim 33, further comprising the step of the check presentment module storing the received information in the record in response to determining that the cash letter has not been printed twice.

* * * * *